(12) United States Patent
Fujino et al.

(10) Patent No.: US 6,691,023 B2
(45) Date of Patent: Feb. 10, 2004

(54) DIAGNOSTIC SYSTEM FOR ENGINE

(75) Inventors: Kenichi Fujino, Iwata (JP); Hitoshi Motose, Iwata (JP); Masahiko Kato, Iwata (JP); Masayoshi Nanami, Iwata (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 391 days.

(21) Appl. No.: 09/800,110

(22) Filed: Mar. 6, 2001

(65) Prior Publication Data

US 2001/0049579 A1 Dec. 6, 2001

Related U.S. Application Data

(63) Continuation-in-part of application No. 09/579,908, filed on May 25, 2000, now abandoned.

(30) Foreign Application Priority Data

| Nov. 24, 2000 | (JP) | 2000-358569 |
| Nov. 24, 2000 | (JP) | 2000-358570 |
| Nov. 24, 2000 | (JP) | 2000-358572 |
| Nov. 24, 2000 | (JP) | 2000-358573 |

(51) Int. Cl.$^7$ .............. G06F 19/00; F02B 1/00
(52) U.S. Cl. .......... 701/114; 701/115; 701/33; 701/120
(58) Field of Search .............. 701/114, 110, 701/115, 102, 33, 29, 35, 117, 120; 440/1, 84, 89; 123/478, 480

(56) References Cited

U.S. PATENT DOCUMENTS

| 6,030,261 A | * | 2/2000 | Motose ................. 440/84 |
| 6,141,608 A | * | 10/2000 | Rother ................. 701/33 |
| 6,144,296 A | * | 11/2000 | Ishida et al. ........... 701/35 |
| 6,415,219 B1 | * | 7/2002 | Degodyuk ............. 701/117 |
| 6,484,693 B1 | * | 11/2002 | Kanno ................. 701/114 |
| 6,553,292 B2 | * | 4/2003 | Kokes et al. ........... 701/33 |
| 2002/0077007 A1 | * | 6/2002 | Dagenais et al. ......... 440/1 |

* cited by examiner

Primary Examiner—Hieu T. Vo
(74) Attorney, Agent, or Firm—Knobbe, Martens, Olson & Bear, LLP.

(57) ABSTRACT

A diagnostic system is provided to aid a technician or engineer in diagnosing an internal combustion engine. The diagnostic system comprises an electronic control unit that is operatively coupled to a data storage device and to one or more engine sensors. The electronic control unit is configured to collect data from the one or more engine sensors and to store that data in the data storage device. A computer is selectively coupled to the data storage device. The computer program is configured to display specific sets of data stored in the data storage device in various formats.

52 Claims, 23 Drawing Sheets

Data Logger [ Data Comparison Graph]

| Min | Engine Speed [r/min] | Fuel Pressure | Battery | Oxygen Sensor | TPS Voltage | Water |
|---|---|---|---|---|---|---|
| 1 | 5250 | 4.99 | 13.48 | 0.02 | 2.7 | 58 |
| 2 | 1450 | 4.72 | 14.36 | 0.79 | 0.72 | 56.7 |
| 3 | 2900 | 4.80 | 14.28 | 0.17 | 2.07 | 53.5 |
| 4 | 4600 | 5.03 | 13.99 | 0.01 | 1.97 | 57 |
| 5 | 4800 | 4.99 | 13.99 | 0 | 2.17 | 58 |
| 6 | 4750 | 4.95 | 13.92 | 0 | 2.17 | 57.5 |
| 7 | 600 | 4.61 | 13.99 | 0.8 | 0.61 | 55 |
| 8 | 600 | 4.65 | 13.99 | 0.81 | 0.61 | 55.5 |
| 9 | 650 | 4.69 | 13.99 | 0.79 | 0.61 | 55 |
| 10 | 600 | 4.61 | 13.99 | 0.82 | 0.64 | 54.5 |
| 11 | 650 | 4.69 | 13.99 | 0.81 | 0.61 | 55 |
| 12 | 650 | 4.69 | 13.99 | 0.83 | 0.61 | 54.5 |
| 13 | 600 | 4.61 | 13.99 | 0.80 | 0.61 | 54.5 |

*Figure 10*

Save date August 01 2000
ECM No: 68F8591A01

Diagnosis

| Code | Item | Result | Condition |
|------|------|--------|-----------|
| 13 | Pulser coil | Normal | |
| 14 | Crank position sensor | Normal | |
| 15 | Water temp sensor | Normal | |
| 18 | Throttle position sensor | Normal | |
| 19 | Battery Voltage | Normal | |
| 22 | Atmospheric press sensor | Normal | |
| 23 | Intake temp sensor | Normal | |
| 25 | Fuel press sensor | Normal | |
| 26 | Injector | Normal | |
| 27 | Water in fuel | No | |
| 28 | Shift postition switch | Normal | |
| 44 | Engine stop lanyard switch | Off | |

Total hours of operation: 59

Diagnosis Record

| Code | Item | Occurred |
|------|------|----------|

Diagnosis Record is unavailable

*Figure 14*

Engine Monitor

| Monitor Item | Result | Unit |
|---|---:|---|
| Engine speed | 0 | r/min |
| Fuel pressure | 0.17 | MPa |
| Fuel presure | 24.42 | psi |
| Atmospheric pressure | 1011.8 | HPa |
| Atmospheric pressure | 30 | inHg |
| Ignition timing |  | deg |
| Battery voltage (12-16) | 12.6 | V |
| Oxygen sensor voltage (0-10) | 0.01 | V |
| TPS voltage (0.5 - 4.5) | 0.61 | V |
| Throttle valve opening (0-90) | 2.3 | deg |
| Fuel injection duration | 0 | ms |
| Water temperature | 39.5 | °C |
| Water temperature | 103.1 | °F |
| Intake temperature | 41.5 | °C |
| Intake temperature | 106.7 | °F |
| Engine stop lanyard switch | OFF |  |
| Main switch | ON |  |
| Shift position switch | ON |  |
| Water detection switch | OFF |  |
| Oil level switch (remote tank) | ON |  |
| Oil level switch1 (engine tank) | OFF |  |
| Oil level switch2 (engine tank) | OFF |  |
| Oil level switch3 (engine tank) | OFF |  |
| Water temp switch (over heat) | OFF |  |
| Dual engine system switch | OFF |  |

*Figure* 15

Data Logger [ Data Comparison Graph]

| Engine Speed [r/min] | Fuel Pressure | Battery | Oxygen Sensor | TPS Voltage | Water | Oil Pressure | ISC θ |
|---|---|---|---|---|---|---|---|
| 5250 | 4.99 | 13.48 | 0.02 | 2.7 | 58 | 520 | 60 |
| 1450 | 4.72 | 14.36 | 0.79 | 0.72 | 56.7 | 350 | 10 |
| 2900 | 4.80 | 14.28 | 0.17 | 2.07 | 53.5 | 400 | 55 |
| 4600 | 5.03 | 13.99 | 0.01 | 1.97 | 57 | 500 | 50 |
| 4800 | 4.99 | 13.99 | 0 | 2.17 | 58 | 500 | 55 |
| 4750 | 4.95 | 13.92 | 0 | 2.17 | 57.5 | 500 | 55 |
| 600 | 4.61 | 13.99 | 0.8 | 0.61 | 55 | 300 | 5 |
| 600 | 4.65 | 13.99 | 0.81 | 0.61 | 55.5 | 300 | 5 |
| 650 | 4.69 | 13.99 | 0.79 | 0.61 | 55 | 300 | 5 |
| 600 | 4.61 | 13.99 | 0.82 | 0.64 | 54.5 | 290 | 5 |
| 650 | 4.69 | 13.99 | 0.81 | 0.61 | 55 | 300 | 5 |
| 650 | 4.69 | 13.99 | 0.83 | 0.61 | 54.5 | 290 | 5 |
| 600 | 4.61 | 13.99 | 0.80 | 0.61 | 54.5 | 290 | 5 |

*Figure 20*

DIAGNOSTIC SYSTEM FOR ENGINE

The present application (i) is a continuation-in-part of U.S. patent application Ser. No. 09/579,908 filed May 25, 2000, now abandoned, which is based on and claims priority to Japanese Patent Application No. 11-146451 filed May 26, 1999 and Japanese Patent Application No. 11-304160 filed Oct. 26, 1999 and (ii) is based on and claims priority to Japanese Patent Application No. 2000-358569 filed Nov. 24, 2000, Japanese Patent Application No. 2000-358572 filed Nov. 24, 2000, Japanese Patent Application No. 2000-358573 filed Nov. 24, 2000 and Japanese Patent Application No. 2000-358570 filed Nov. 24, 2000. The entire contents of these applications are hereby expressly incorporated by reference.

BACKGROUND OF THE INVENTION

1. Field of the Invention

This invention relates to engine diagnostics and, in particular to an improved apparatus and method for identifying and diagnosing various engine problems.

2. Related Art

Internal combustion engines are commonly used to power boats and other watercraft. For example, outboard motors typically include an internal combustion engine that is surrounded by a protective cowling. The internal combustion engine drives a propulsion device such as, for example, a propeller. Internal combustion engines are used to power personal watercraft and larger boats as well.

As with other types of engines, the diagnostic systems of marine engines indicate malfunctions through diagnostic codes, which are displayed through a pattern of lights. However, as the number of sensors in an engine have increased, the diagnostic codes have become more complicated and difficult to understand. Moreover, as engines have become more sophisticated and complicated, many engine technicians do not have the requisite skills to diagnose engine malfunctions. A need therefore exists for an improved engine diagnostic system.

SUMMARY OF THE INVENTION

Accordingly, one aspect of the present invention is a method for diagnosing a malfunction in a motor for a watercraft that comprises an engine and an electronic control unit that is operatively connected to a memory storage device. Operational data is collected from one or more engine sensors with an electronic control unit that is operatively connected to the one or more sensors. The operational data from the one or more engine sensors is stored in the memory storage device. The operational data from the memory storage device is retrieved with a computer that is operatively connected to the electronic control unit. A chosen set of operational data is displayed on a display screen.

Another aspect of the invention is a diagnostic system for aiding a technician or engineer in diagnosing an engine malfunction in a motor that comprises and engine and is associated with a watercraft. The diagnostic system comprises an electronic control unit that is operatively coupled to a data storage device and to one or more engine sensors. The electronic control unit is configured to collect operational data from the one or more engine sensors and to store the collected operational data in said data storage device. The diagnostic system further comprises a computer with a computer processor operatively coupled to a memory. The computer also comprises an interface device, a display monitor, and a computer program stored in the memory and configured to retrieve operational data from the data storage device. The computer program also is configured to display the operational data collected from the engine sensors.

Yet another aspect of the invention is a method for diagnosing a malfunction in a motor for a watercraft that comprises an engine and an electronic control unit that is operatively connected to a first memory storage device and a second memory storage device. An operational condition is defined by dividing one or more operational data into groups. A set of operational groups is defined based upon said groups of operational data. The operational data is collected from one or more engine sensors with an electronic control unit that is operatively connected to the one or more sensors. A current operational group is identified. The current operational group is stored in the first memory storage device. It is determined if a predetermined amount of time has passed. If the predetermined amount of time has passed, the predetermined amount of time is added to an accumulated operating time for the current operational group so as to calculate a new accumulated operating time. The new accumulated operating time is stored in the second memory device.

All of these aspects are intended to be within the scope of the invention herein disclosed. These and other aspects of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These aspects and other features, aspects and advantages of the present invention will now be described with reference to the drawings of several preferred embodiments, which embodiments are intended to illustrate and not to limit the present invention, and in which drawings:

FIG. 10 is a table of data that can be displayed on the display screen of FIG. 4;

FIG. 14 is a table of data that can be displayed on the display screen of FIG. 4;

FIG. 15 is a table of data that can be displayed on the display screen of FIG. 4;

FIG. 20 is a table of data that can be displayed on the display screen of FIG. 4;

DETAILED DESCRIPTION OF THE PREFERRED EMBODIMENTS OF THE INVENTION

Figure 1:
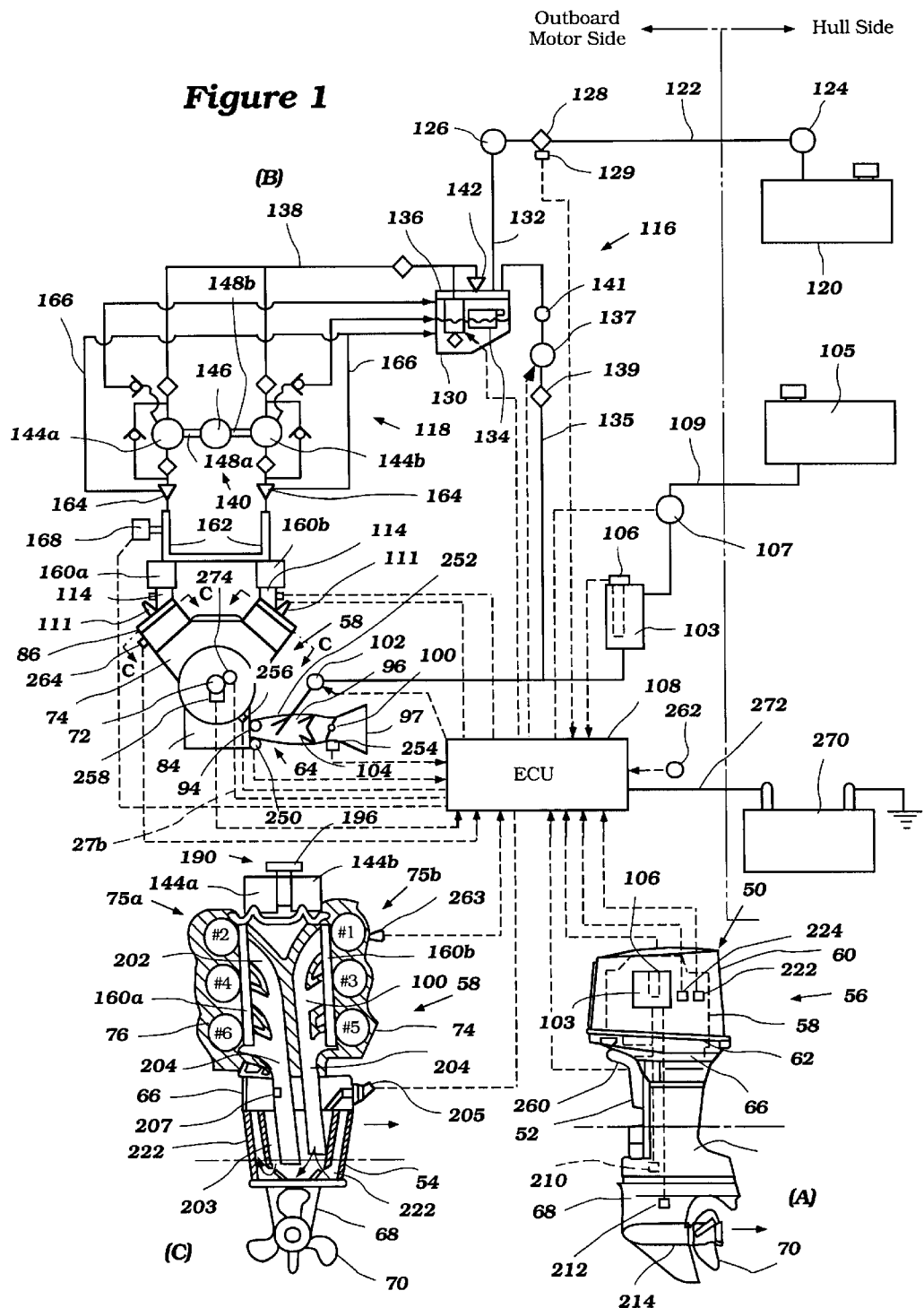
FIG. 1 is a multi-part view showing: (A) in the lower right hand portion, a side elevation view of an outboard motor employing certain features, aspects and advantages of the present invention; (B) in the upper view, a partially schematic view of the engine of the outboard motor with its induction and fuel injection system shown in part schematically; and (C) in the lower left hand portion, a rear elevation view of the outboard motor with portions removed and other portions broken away and shown in section along the line C—C in the upper view B so as to more clearly show the construction of the engine. An ECU (electric control unit) for the motor links the three views together.

With reference now to FIG. 1, an outboard motor with an engine diagnostic system having certain features, aspects and advantages of the present invention will be described. The engine diagnostic system is described in conjunction with an outboard motor to provide an exemplary environment in which the system may be employed. Although the engine diagnostic system has particular applicability to an outboard motor, it is anticipated that the engine diagnostic system can have utility in other environments of use. In particular, the engine diagnostic system may also find utility in applications where the engine is compact, used in remote locations, or both. Such applications also might include, without limitation, engines in personal watercraft, small jet boats, motorcycles and off-road vehicles.

In the lower right hand view of FIG. 1 (i.e., FIG. 1(A)), the outboard motor is depicted in side elevation view and is identified generally by the reference numeral 50. The outboard motor 50 preferably includes a clamping arrangement 52. The clamping arrangement 52 is used to attach the outboard motor 50 to the hull of the watercraft (not shown) in any suitable manner. The outboard motor 50 preferably is connected to the hull of the watercraft such that it may be steered about a generally vertical axis and tilted or trimmed about a generally horizontal axis.

The outboard motor 50 generally comprises a drive shaft housing 54 and a powerhead 56, which is positioned generally above, and generally is supported by, the drive shaft housing 54. The powerhead 56 preferably includes a powering internal combustion engine, which is indicated generally by the reference numeral 58. The engine 58 also is shown in the remaining two views of FIG. 1 (i.e., FIGS. 1(B) and 1(C)) and, therefore, will be described in more detail below with reference to these portions of FIG. 1.

The illustrated powerhead 56 generally includes a protective cowling which comprises a main cowling portion 60 and a lower tray portion 62. The main cowling portion 60 preferably includes a suitable air inlet arrangement (not shown) to introduce atmospheric air into the interior of the protective cowling. The air present within the protective cowling then can be drafted into an engine intake system or induction system, which is generally indicated by the reference numeral 64 (see FIG. 1(B)) and which will be described in greater detail directly below.

The main cowling portion 60 preferably is detachably connected to the lower tray portion 62 of the powerhead 56. The detachable connection preferably is generally positioned proximate an exhaust guide plate 66. The exhaust guide plate 66 is encircled by an upper portion of the drive shaft housing 54 and forms a portion of an exhaust system, which will be described below. Positioned beneath the illustrated drive shaft housing 54 is a lower unit 68 in which a propeller 70 is journaled for rotation. As these constructions are well known to those of ordinary skill in the art, further description of these components is unnecessary.

As is typical with outboard motor practice, the illustrated engine 58 is supported in the powerhead 56 so that a crankshaft 72 (see FIG. 1(B)) can rotate about a generally vertically extending axis. FIG. 1(B) schematically illustrates the engine from a top view. The vertical mounting of the crankshaft 72 facilitates the connection of the crankshaft 72 to a driveshaft (not shown) that depends into and through the driveshaft housing 54. The driveshaft drives the propeller 70 through a forward, neutral and reverse transmission (not shown) contained in the lower unit 68. Of course, other suitable types of transmissions also can be used with certain features, aspects and advantages of the present invention.

With reference now to FIG. 1(C), the illustrated engine 58 is of the V6 type and operates on a 2-stroke crankcase compression principle. It is anticipated that the present fuel supply system can also can be utilized with engines having other cylinder numbers and other cylinder configurations. For instance, the cylinders can be arranged in-line in some arrangements, and the engine can comprise as few as one or more than eight cylinders in various other arrangements. Moreover, as will be explained later, certain features of the engine diagnostic system also may find utility with engines operating on other operating principles, such as a rotary principle or a four-cycle principle.

With reference now to FIGS. 1(B) and 1(C), the illustrated engine 58 is generally comprised of a cylinder block 74 that is formed with a pair of cylinder banks 75a,b. Each of these cylinder banks 75a,b preferably is formed with three vertically-spaced, horizontally-extending cylinder bores 76 (numbered #1–#6 in FIG. 1(C)). In some arrangements, separate cylinder bodies for each cylinder bore can be used in place of the single cylinder block. For instance, each cylinder body may accommodate but a single cylinder bore and a number of cylinder bodies can be aligned side by side yet be formed separate from one another.

A set of corresponding pistons (not shown) preferably are arranged and configured to reciprocate within the cylinder bores 76. The pistons are connected to the small ends of connecting rods (not shown). The big ends of the connecting rods preferably are journaled about the throws of the crankshaft 72 in a well known manner.

The crankshaft 72 is journaled in any suitable manner for rotation within a crankcase chamber (not shown). Desirably, the crankcase chamber (not shown) is formed, at least in part, by a crankcase member 84 that may be connected to the cylinder block 74 or the cylinder bodies in any suitable manner. As is typical with 2-stroke engines, the crankshaft 72 and the crankcase chamber (not shown) preferably are formed with dividing seals or dividing walls such that each section of the crankcase chamber (not shown) associated with one of the cylinder bores 76 can be sealed from the other sections that are associated with other cylinder bores. This type of construction is well known to those of ordinary skill in the art.

With reference to FIG. 1(B), a cylinder head assembly, indicated generally by the reference numeral 86, preferably is connected to an end of each of the cylinder banks that is spaced from the crankcase member 84. Each cylinder head assembly 86 generally is comprised of a main cylinder head member and a cylinder head cover member, which are not shown. The cylinder head cover member is attached to the cylinder head member in any suitable manner. As is known, the cylinder head member preferably includes a recess that corresponds with each of the cylinder bores 76. As will be appreciated, each of the recesses cooperates with a respective cylinder bore 76 and a head of a reciprocating piston to define a variable volume combustion chamber.

With reference again to FIG. 1(B), the air induction system 64 is provided for delivering an air charge to the sections of the crankcase chamber (not shown) associated with each of the cylinder bores 76. In the illustrated arrangement, communication between the sections of the crankcase chamber and the air contained within the cowling occurs at least in part via an intake port 94 formed in the crankcase member 84. The intake port 94 can register with a crankcase chamber section corresponding to each of the cylinder bores 76 such that air can be supplied independently to each of the crankcase chamber sections. Of course, other arrangements are also possible.

The induction system 64 also includes an air silencing and inlet device, which is shown schematically in FIG. 1(B) and indicated generally by the reference numeral 96. In one arrangement, the device 96 is contained within the cowling member 60 at the cowling's forward end and has a rearwardly-facing air inlet opening 97. The air inlet device 96 may include a silencer (not shown)

The air inlet device 96 supplies the air from within the cowling to a plurality of throttle bodies, or valves 100. The illustrated throttle valves are desirably supported on throttle valve shafts that are linked to each other for simultaneous opening and closing of the throttle valves in a manner that is well known to those of ordinary skill in the art. It is anticipated, however, that a single supply passage can extend to more than one or even all of the chambers such that the number of throttle valves can be one or more than one depending upon the application.

A lubricant pump 102 preferably is provided for spraying lubricant into the air inlet device 96 for lubricating moving components of the engine 58 in manners well known to those of ordinary skill in the art. In addition, a small amount of lubricant also can be introduced into the fuel prior to introduction to a fuel injector system that will be described below. Preferably, the lubricant pump 102 is controlled by an ECU 108, which also will be described in more detail later.

The lubricant pump 102 in the illustrated arrangement draws lubricant from a first lubricant supply tank 103, which in the illustrated arrangement is located in the outboard motor 50. Lubricant is supplied to the first lubricant supply tank 103 from an auxiliary tank 105, which in the illustrated arrangement is provided in the hull of the watercraft associated with the outboard motor 50. Preferably, a second lubricant pump 107 transfers lubricant from the auxiliary tank 105 to the first lubricant supply tank through a supply line 109. The first lubricant supply tank 103 preferably includes a lubricant level sensor 106 that sends a signal to the ECU 108 if the lubricant drops below a preset level. Of course, those of skill in the art will recognize that other arrangements also can be used to supply lubricant to the engine 58.

As is typical in 2-cycle engine practice, the illustrated intake ports 94 include reed-type check valves 104. The check valves 104 permit inducted air to flow into the sections of the crankcase chamber when the pistons are moving upwardly in their respective cylinder bores 76. The reed-type check valves 104, however, do not permit back flow of the air. Therefore, as the pistons move downwardly within the respective cylinder bores 76, the air charge will be compressed in the sections of the crankcase chamber. As is known, the air charge is then delivered into the associated combustion chamber through suitable scavenge passages (not shown). This construction is well known to those of ordinary skill in the art.

A spark plug 111 is mounted within the cylinder head 86 and has an electrode disposed within the combustion chamber. The spark plug 111 is fired under the control of the ECU 108 in any suitable manner. For instance, the ECU 108 may use a CDI system to control ignition timing according to any of a number of suitable control routines. The spark plug 111 ignites an air-fuel charge that is formed by mixing the fuel directly with the air inducted into the combustion chamber.

The fuel is preferably provided via respective fuel injectors 114. The fuel injectors 114 preferably are of the solenoid type and preferably are electronically or electrically operated under the control of the ECU 108. The control of the fuel injectors 114 can include the timing of the fuel injector injection cycle, the duration of the injection cycle, and other operating parameters of the fuel injector 114.

With continued reference to FIG. 1(B), fuel is supplied to the fuel injectors 114 by a fuel supply system that features a low pressure portion 116 and a high pressure portion 118. The low pressure portion 116 includes a main fuel supply tank 120 that can be provided in the hull of the watercraft with which the outboard motor 50 is associated. The preferred location of the main fuel supply tank 120 and the main lubricant reservoir 105 exterior to the outboard motor is demonstrated in FIG. 1(B) through the use of phantom lines. Fuel can be drawn from the main tank 120 through a supply conduit 122 using a first low pressure pump 124. In some arrangements, a plurality of secondary low pressure pumps 126 also can be used to draw the fuel from the fuel tank 120. The pumps can be manually operated pumps, diaphragm-type pumps operated by variations in pressure in the sections of the crankcase chamber, or any other suitable type of pump. Preferably, the pumps 124, 126 provide a relatively low pressure draw on the fuel supply.

In addition, in the illustrated arrangement, a fuel filter 128 is positioned along the conduit 122 at an appropriate location, preferably within the main cowling 60 such that the fuel filter may be easily serviced. The fuel filter in the illustrated arrangement is used to remove undesirable amounts of water from the fuel. Therefore, the fuel filter 128 includes a sensor 129 that sends a signal to the ECU 108 upon a detection of such water or upon a preset amount of water having been removed from the fuel.

From the illustrated secondary low pressure pump 126, the fuel is supplied to a low pressure vapor separator 130. The vapor separator 130 can be mounted on the engine 58 in any suitable location. In addition, in some arrangements, the vapor separator 130 is separate from the engine, but positioned within the cowling portion 60 at an appropriate location. The fuel is supplied to the vapor separator 130 through a supply line 132. At the vapor separator end of the supply line 132, there preferably is provided a valve, which is not shown, that can be operated by a float 134 so as to maintain a substantially uniform level of fuel in the vapor separator tank 130.

As described above, the fuel supply preferably receives a small amount of lubricant from the lubricant system at a location upstream of the fuel injectors 114. In the illustrated arrangement, the vapor separator tank 130 receives a small amount of lubricant from the lubricant system through a supply conduit 135. A premixing pump 137 draws the lubricant through the supply conduit 135 that empties into the vapor separator tank 130. A filter 139 and a check valve 141 preferably are provided along the conduit 135. The filter 139 removes unwanted particulate matter and/or water while the check valve 141 reduces or eliminates back-flow through the supply conduit 135. Notably, the premixing pump 137 preferably is controlled by the ECU 108. This control can be at least partially dependent upon the flow of fuel and the flow of return fuel into the vapor separator tank 130.

A fuel pump 136 can be provided in the vapor separator 130 and can be controlled by ECU 108 in any suitable manner. The fuel pump 136 preferably pre-pressurizes the fuel that is delivered through a fuel supply line 138 to a high pressure pumping apparatus 140 of the high pressure portion 118 of the fuel supply system. The fuel pump 136, which can be driven by an electric motor in some arrangements, preferably develops a pressure of about 3–10 kg per cm$^2$. A pressure regulator 142 can be positioned along the line 138 proximate the vapor separator 130 to limit the pressure of the fuel that is delivered to the high pressure pumping apparatus 140 by dumping some portion of the fuel back into the vapor separator 130.

The illustrated high pressure fuel delivery apparatus 140 includes two high pressure fuel pumps 144a, 144b that can develop a pressure of, for example, 50-100 kg per cm$^2$ or more. A pump drive unit 146 preferably is provided for driving the high pressure fuel pumps 144a,b. Preferably, the pump drive unit 146 is partly affixed to the cylinder block 74 so as to overhang between the two banks of the V arrangements. A pulley (not shown) is affixed to a pump drive shaft of the pump drive unit 146. The pulley can be driven by means of a drive belt (not shown) that is wrapped about a driving pulley affixed to the crankshaft 72. A tensioner is preferably provided for giving tension to the drive belt. The pump drive shaft is preferably provided with a cam disc (not shown) for operating one or more plungers 148a, 148b of any known type. Of course, any other suitable driving arrangement can also be used.

With reference to FIG. 1(B), the high pressure fuel pumps 144a, 144b preferably supply fuel to a pair of supply rails 160a, 160b, which run in the vertical direction as shown in FIG. 1(C). The fuel rails 160a, 160b, deliver fuel to the fuel injectors 114 and are disposed along the cylinder banks 75a,b. High pressure connection hoses 162 preferably connect the supply rails 160a, 160b to the high pressure fuel pumps 144a, 144b. Preferably, high pressure adjusting valves 164 are located between the high pressure fuel pumps 144a, 144b and the high pressure adjusting hoses 162. The high pressure adjusting valves preferably dump fuel back to the vapor separator 130 through pressure relief lines 166 in which a fuel heat exchanger or cooler (not shown) preferably is provided. Generally, the fuel is desirably kept under constant or substantially constant pressure so that the volume of injected fuel can be at least partially determined by changes of duration of injection under the condition that the pressure for injection is always approximately the same. Accordingly, on the fuel rails 160a, 160b, a fuel pressure sensor 168 preferably is provided for sending a signal to the ECU 108 indicating the fuel pressure at the fuel injectors 114. A set of recirculating lines and check valves are also provided to allow fuel to be returned to the line 138.

As discussed above, the air delivered by the induction system receives the charge of fuel within the combustion chamber and the air/fuel charge is ignited by the ignition system at an appropriate time. After the charge is ignited, the charge burns and expands such that the pistons are driven downwardly in the respective cylinder bores 76 until the pistons reach a lower-most position. During the downward movement of the pistons, the exhaust ports (not shown) are uncovered by the piston to allow communication between the combustion chamber and an exhaust system.

With reference to FIG. 1(C), the illustrated exhaust system features an exhaust manifold section 200 for each of the cylinder banks. A plurality of runners 202 extend from the cylinder bores 76 into the manifold collectors 200. The exhaust gases flow through the runners 202 into the manifold collector section 200 of the respective exhaust manifolds that are formed within the cylinder block 74 in the illustrated arrangement. The exhaust manifold collector sections 200 then communicate with exhaust passages formed in exhaust guide plate 66 on which the engine 58 is mounted.

A pair of exhaust pipes 204 depend from the exhaust guide plate 66 and extend the exhaust passages into an expansion chamber 203 formed within the drive shaft housing 54. From this expansion chamber 203, the exhaust gases are discharged to the atmosphere through a suitable exhaust outlet. As is well known in the outboard motor practice, the suitable exhaust outlet may include an under water, high speed exhaust gas discharge and an above the water, low speed exhaust gas discharge. Because these types of systems are well known to those of ordinary skill in the art, a further description of them is not believed to be necessary to permit those of ordinary skill in the art to practice the present invention.

In the expansion chamber 203, a back pressure sensor 205 is provided for indicating to the ECU 108 the pressure (back pressure) of the exhaust gas. The exhaust system preferably also includes an air oxygen detection sensor 207, which sends a signal to the ECU 108 indicating the oxygen concentration in the exhaust gas. The oxygen detection sensor 207 can be used to detect how complete combustion is within the combustion chamber in any manner known to those of ordinary skill in the art.

Figure 2:
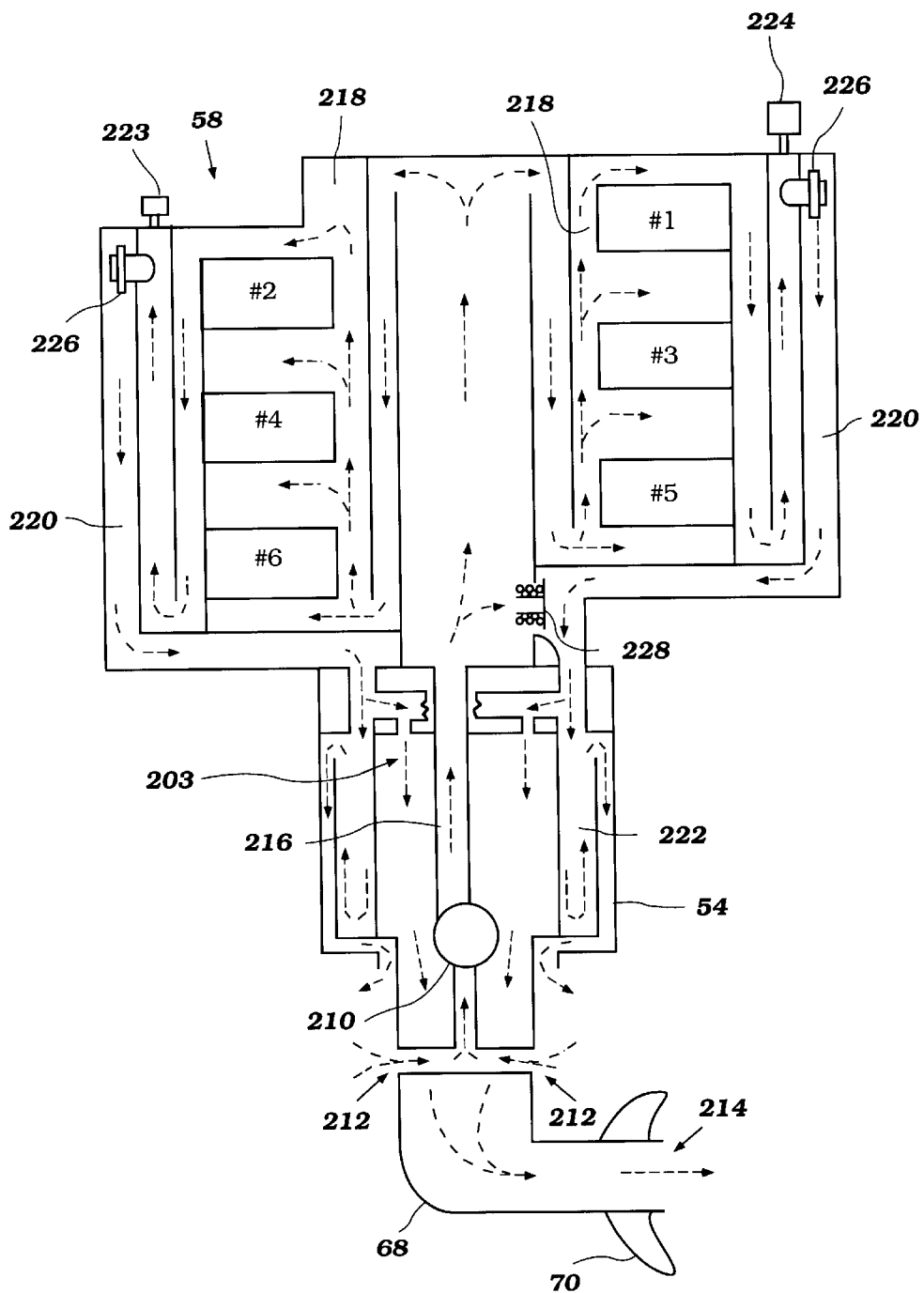
FIG. 2 is a schematic view of a cooling system of the outboard motor.

The illustrated outboard motor 50 also comprises a water cooling system. With reference to FIG. 1(A) and FIG. 2, the cooling system generally comprises a water pump 210, a pick-up 212 and a discharge 214. The water pump 210 preferably is driven by the rotary motion of the crankshaft 72 and, in some applications, can be driven by the driveshaft. The pump 210 pulls water from the body of water in which the watercraft is operating through a pick-up 212 and delivers it through a coolant passage 216 to the engine 58. As best seen in FIG. 2, the water, which is indicated by the dashed lines with arrows, circulates through a coolant jacket 218, which surrounds the cylinders 76 of the engine 58. The water then flows into a drainage passage 220 after flowing through the cylinder head assembly 86. Part of the water from the drainage passage 220 is directed towards a water wall 222, which surrounds the expansion chamber 203. Most of the water from the drainage passage 220 is discharged into the expansion chamber 203 and discharged with the exhaust gas through the discharge 214 located in the propeller 70.

The cooling system preferably includes a cooling-water temperature sensor 223, which sends a signal to the ECU 108 indicting the temperature of the cooling water, and a cooling-water pressure sensor 224, which sends a signal to the ECU 108 indicating the pressure of the cooling water. Preferably, the cooling system also includes a thermostats 226, which are located between the water jacket 218 and the drainage passages 220. The thermostats are configured to open when the water temperature is above a predetermined temperature. A pressure control valve 228 preferably is located between the water supply passage 216 and the cooling-water drain passage 220. The pressure control valve 228 is configured to open when the pressure in the water supply passage 216 exceeds a predetermined pressure so that the cooling water can flow from the water supply passage 216 directly to the cooling-water drain passage 220. With this arrangement, the thermostats 226 remain closed the until water temperature in the water jacket 218 reaches a predetermined temperature. This raises the pressure in the water supply passage 216, when the engine 58 is started. Accordingly, cooling water can flow from the water supply passage 216 to the cooling-water drain passage 220. This prevents excess cooling of the engine 58.

The outboard motor 50 also includes an engine control system, which controls various engine operations. The engine control system includes (i) the ECU 108 and (ii) various sensors and actuators, some of which have been described above. As is well known in the art, to appropriately control the engine 58, the engine control system preferably utilizes maps and/or indices stored within the memory of the ECU 108, or accessible to the ECU 108, with reference to the data collected from various sensors. For example, the engine control system may refer to data collected from the fuel pressure sensor 168 and other sensors provided for sensing engine running conditions, ambient conditions or conditions of the outboard motor 10 that will affect engine performance.

It should be noted that the ECU 108 may be in the form of a hard wired feed back control circuit. Alternatively, the ECU may be constructed of dedicated processor and a memory for storing a computer program configured to perform operations described below. Additionally, the ECU may be a general purpose computer having a general purpose processor and sufficient memory for storing a computer program for performing the operations described below.

In addition to the sensors described above, the engine control system preferably also includes other sensors such as those described below. An intake air pressure sensor 250 is provided to detect the pressure within the air induction system 64. The induction system 64 preferably also includes an intake air temperature sensor 252, which detects the air temperature in the induction system 64, and a throttle-opening sensor 254 which detects the position of the throttle valve 100. The ECU 108 preferably also receives a signal from an atmospheric pressure sensor (not shown), which provides a signal indicative of the pressure in the environment in which the watercraft is operating. A suitable speed sensor 256 preferably is provided to sense the engine speed, as may be indicated by the rotational speed of the crankshaft 72. The illustrated arrangement also includes a crank angle position sensor 258 for detecting the angular position of the crankshaft 72. The ECU 108 also receives a signal from a trim angle sensor 260. The trim angle sensor 260 sends a signal to the ECU 108 that is indicative of the tilt or trim angle of the outboard motor 50 relative to the watercraft on which the outboard motor 50 is mounted. An engine knock sensor 262 (e.g., a vibration sensor) sends a signal to the ECU 108 that indicates when engine knocking occurs. An air/fuel sensor 263 is arranged to detect the air-fuel ratio, preferably, in the top cylinder. A cylinder body temperature sensor 264 is arranged to sense the temperature of the cylinder block 76.

While the control system generally comprises the ECU 108 and the above listed sensors which sense various operating conditions for the engine as well as ambient conditions and/or conditions of the outboard motor that may affect general engine performance, other sensors can also be used with the present invention. While certain of the sensors have been shown schematically in FIG. 1, and were described, it should be readily apparent to those of ordinary skill in the art that other types of sensing arrangements also can be provided for performing the same functions and/or different functions. Moreover, it is also possible to provide other sensors in accordance with various control strategies. Of course, the signals to actuators and from sensors, while being depicted with wire connections, also can be transmitted using radio waves, infrared transmitter and receiver pairs, and other suitable or similar techniques.

The ECU 108 preferably is connected to a battery 270 by a battery cable 272. A generator 274 (FIG. 1(B)) preferably is provided for generating electricity from the crankshaft 72. The generator 274 preferably supplies electricity to the ECU 108 and battery through a supply cable 276. The ECU 108 preferably detects battery voltage through its connection with the battery 270.

With reference to FIGS. 3–19 a diagnostic system 300 will now be described. As shown in FIG. 4, the diagnostic system 300 preferably includes the ECU 108 and a secondary diagnostic system 302, which includes a computer 304. The secondary diagnostic system 302 will be described in more detail below. The diagnostic system 300 also includes at least some of the various engine sensors and actuators, which were described above that are operatively connected to the ECU 108. It should be appreciated that, in the preferred embodiment, the diagnostic system 300 is a subsystem of the engine control system described above. Accordingly, the diagnostic system 300 shares several components with the engine control system, such as, for example, the ECU 108. However, it should be appreciated that the diagnostic system 300 could include separate components or be entirely separate from the engine control system. Preferably, the diagnostic system 200 is a subsystem of the engine control system because this arrangement reduces the number of parts and the overall cost of the outboard motor 50.

Figure 3:
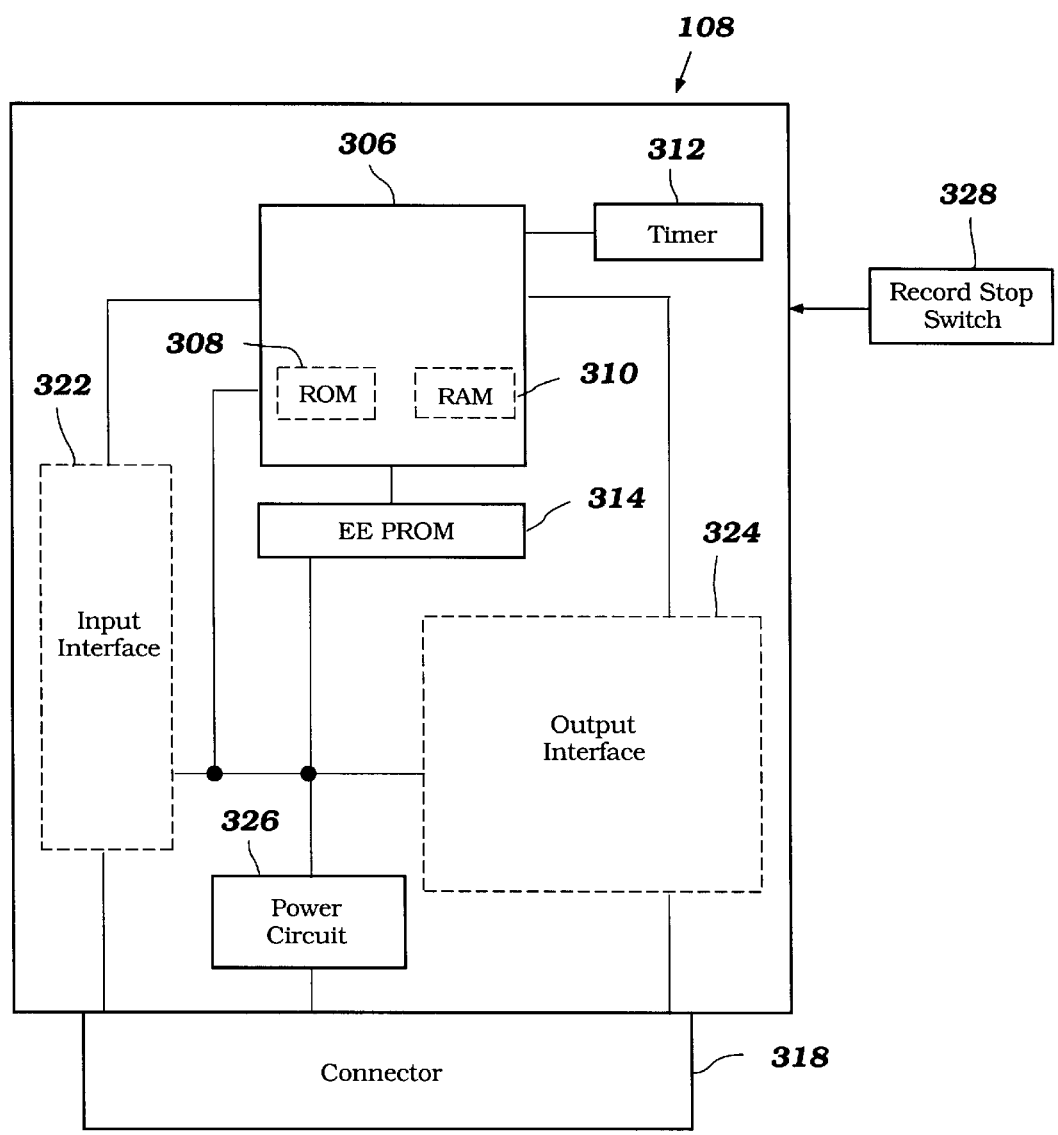
FIG. 3 is a schematic illustration of the ECU.
Figure 4:
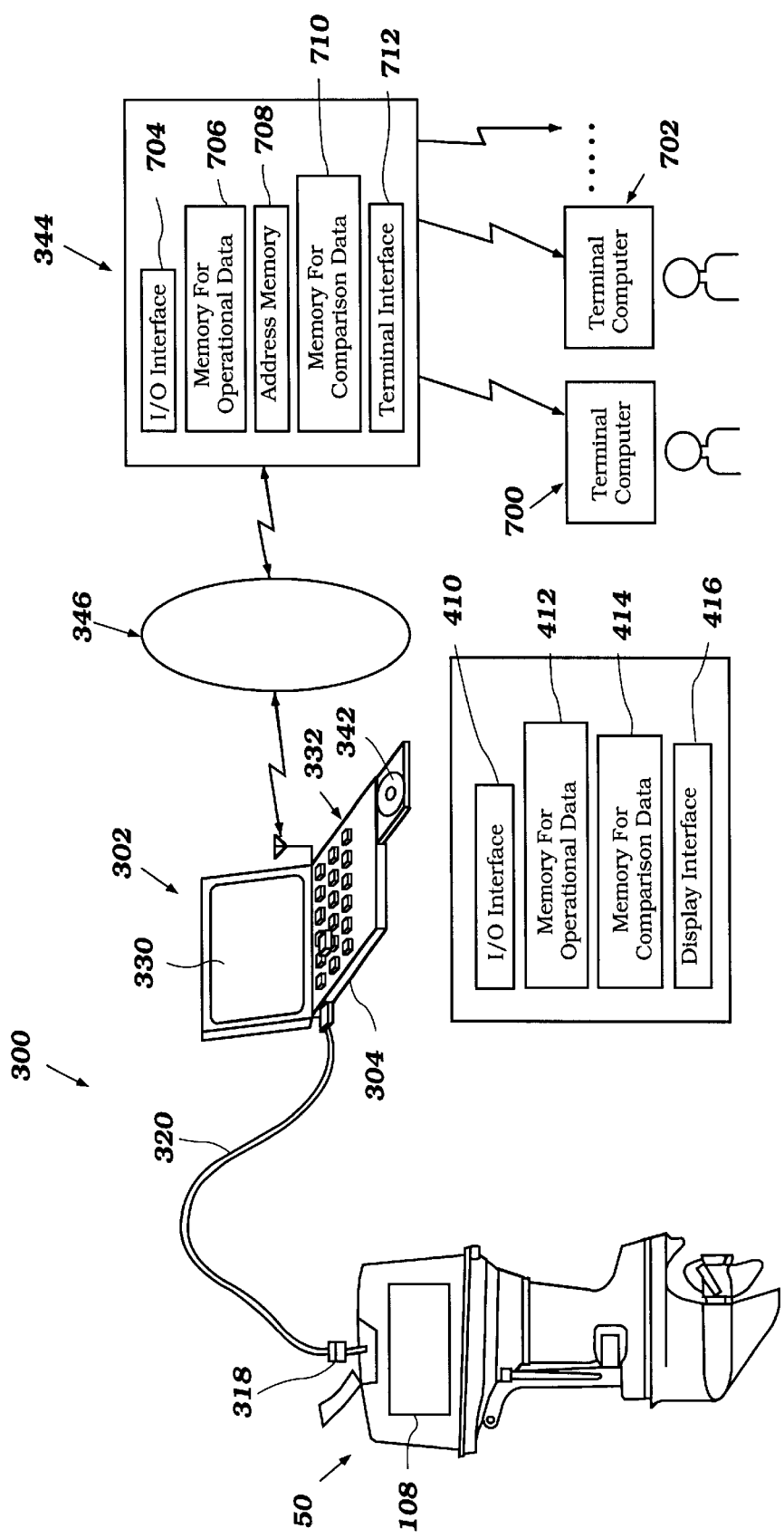
FIG. 4 is a schematic illustration of a diagnostic system having certain features and advantages according to the present invention, the diagnostic system including a computer with a display screen.

With particular reference to FIG. 3, the ECU 108 preferably includes an CPU 306 for processing for performing various function and calculations and for executing the various subroutines that will be described below. The ECU 108 preferably also includes (i) a first data storage device 308, such as, for example, ROM, for storing the various subroutines, control maps and/or indices and (ii) a second data storage device 310, such as, for example, RAM for temporarily storing work data as will be explained below. As is known in the art, when the power to the ECU 108 is turned off, the data stored in the RAM 310 is typically lost while the data in the ROM 308 remains saved. The ECU 108 preferably also comprises (i) a timer 312 (i.e., a counter) for measuring the accumulated time from when the outboard motor begins operation and for measuring time that is used in the various processing steps described below and (ii) a third data storage device 314, which is preferable non-volatile such as, for example, electrically erasable programmable read-only memory (EEPROM) for storing engine specific diagnostic information or engine identifying information as will be described below. It should be appreciated that the timer 312 and the data storage devices 308, 310, 314 can be integrated into the ECU 108 as shown or can be separate components that are operatively connected to the ECU 108.

With reference to FIGS. 3 and 4, the ECU 108 preferably includes a connector 318 that can be pulled out from the upper part or a side part of the outboard motor 40. The connector 318 is configured to be connected to a standard communication cable 320, which preferably is connected to the computer 304 of the diagnostic support system 302. Preferably, the ECU 108 also includes an input interface 322 and an output interface 324, which are used to transmit data and command signals between the ECU 108 and the computer 304. The connector 318 preferably is also configured to receive an electrical power supply from the diagnostic support system 302. As such, the ECU 108 preferably also includes a power supply circuit 326 such that the ECU 108 can operate without power being supplied by the battery 270. A record stop switch 328 preferably also provided. The record stop switch 328 is connected to the ECU 108 and allows the user to stop the sampling of data, as will be explained in more detail below.

The computer 304 of the diagnostic support system 302 is preferably a personal computer with a CPU and supporting industry standard architecture. The computer 304 includes a video display monitor 330 for displaying data and an interface 332 such as a keyboard for inputting data. The computer preferably also includes an additional storage device 342, such as, for example a CD-ROM for storing or accessing various data used by the diagnostic support system 302. As will be explained in more detail below, the computer 304 can be connected to a server computer 344 through a network line 346, such as, for example the internet.

Now that the basic components of the engine diagnostic system 300 have been described, methods and apparatus for collecting and storing data for engine diagnostics will now be described. In particular, several subroutines that are configured to collect and/or store data that is useful for engine diagnostics will now be described.

Figure 5:
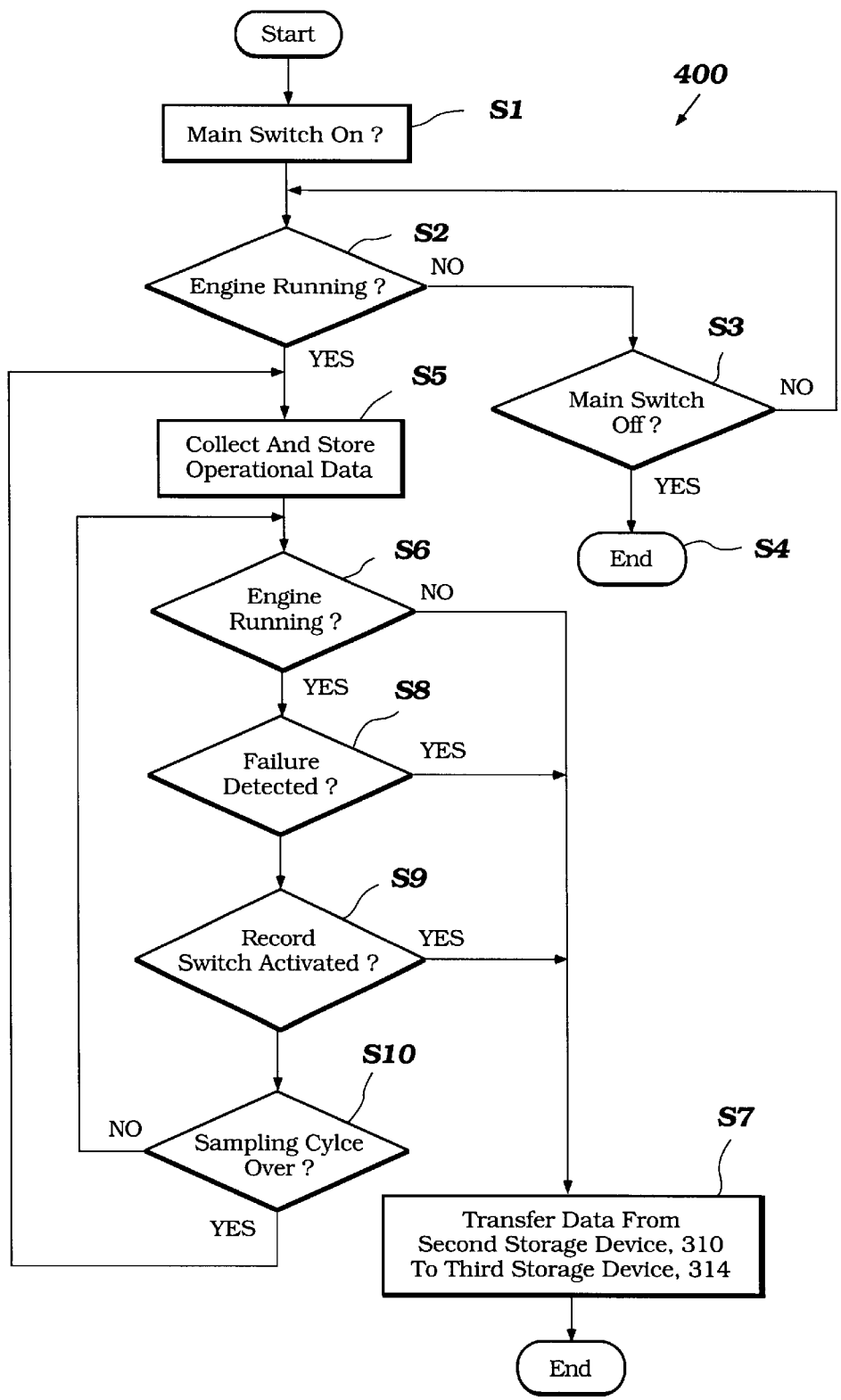
FIG. 5 is a flow diagram of a subroutine that can be used with the ECU of FIG. 1.

FIG. 5 illustrates one such control subroutine 400 of the engine diagnostic system 300 that can be executed by the ECU 108 for collecting and storing data for a set time period. As represented by operational block S1, the subroutine 400 first initializes, preferably, when a main switch, such as, for example, an ignition starting device (e.g., a key activated switch) is activated. As represented by decisional block S2, the diagnostic system 300 determines if the engine 58 is running. This can be determined from the pulses sent by the crank angle position sensor 258. If the engine 58 is not running, the diagnostic system 300 determines if the main switch is off as represented by decisional block S3. If the main switch has not been turned off, the routine 400 loops back to decisional block S1. If the main switch has been turned off, the subroutine 400 ends as indicated by operational block S4.

If the engine is running, the diagnostic system 400 collects and stores operational data as indicated by operational block S5. The operational data collected and stored preferably includes at least some of the following data: (i) the engine speed, which is preferably determined from the crank-angle position sensor 258, (ii) the throttle valve 100 position, which preferably is determined from the throttle angle position sensor 254, (iii) the air-fuel ratio, which preferably is determined from the air/fuel sensor 263, (iv) the battery voltage, which preferably is determined from by the ECU 108 (v) the fuel pressure, which preferably is determined from the fuel pressure sensor 168, (vi) the cooling-water temperature, which preferably is determined from the cooling-water temperature sensor 223, (vii) the back pressure of the exhaust gas, which preferably is determined from the back pressure sensor 205, (viii) the intake pressure, which preferably is determined from the intake air pressure sensor 250 and (ix) the cooling water pressure, which preferably is determined from the cooling-water pressure sensor 224.

The operational data preferably is stored within the second storage device 310 (e.g., RAM) of the ECU 108. Preferably, the operational data that is being collected is assigned and stored with a time value, which corresponds to the sampling cycle within a time period. For example, if the data is being collected at one minute intervals the most recent data just collected is assigned a value of zero. The data collected a minute ago is reassigned a value of one minute ago. The data collected two minutes ago is reassigned the value of two minutes ago and so on. As new data is collected, the new data is assigned a value of zero and the most recently stored data is reassigned. Preferably, the data storage device stores the data for a fixed time period. In the preferred embodiment, the sample cycle is approximately 1 minute and the time period is approximately thirteen minutes. As such, the storage device, in the preferred embodiment, stores operational data at thirteen time positions. This arrangement is preferred because it reduces the amount of data that has to be stored by the first data storage device 310 while still providing enough information for engine diagnostics as will be explained below. In modified arrangements, the time period and the sampling cycle can be increased or decreased. In general, if memory storage permits, longer time periods and shorter sampling cycles are preferred.

After the operational data is collected and stored, the diagnostic system 300 determines if the engine 58 has stopped running as indicated by decisional block S6. Preferably, this is determined from the pulses sent by the crank angle position sensor 258. If the engine has stopped running, the diagnostic system 300 transfers the operational data stored in the second storage device 310 to the third storage device 314 (operational block S7), which in the preferred arrangement is a non-volatile storage device, such as, for example, an electrically erasable programmable read-only memory (EEPROM). In this manner, the operational data stored in the second storage device 310 can be accessed and used for engine diagnosis as will be explained below.

If the engine 58 is running, the diagnostic system 300 determines if there is an engine failure, as indicated by decisional block S8. An engine failure is determined by sampling the various data collected the various sensors, which are operatively connected to the ECU 108. A failure is indicated when the output value from the various signals show a clear abnormal value (i.e., below/above a preset value). Abnormal values indicate situations that do not normally occur during normal engine operation. For example, a battery voltage of zero or a water-cooling temperature above a predetermined value are abnormalities. If an abnormal value is detected, the diagnostic system transfers the data from the second storage device 310 to the third storage device 314, as indicated by operational block S7. Preferably, the time of the failure is also transferred to the third storage device 314.

If an engine failure has not occurred, the diagnostic system 300 determines if the recordswitch 328 has been activated (decisional block S9). If the switch 328 has been activated, operational data from the second storage device 310 is transferred to the third storage device 314, as indicated by operational block S7. In this manner, an engine technician or operator can control when operational data is stored in the third storage device 314. If the record switch 328 has not been activated, the diagnostic system 300 moves on to decisional block S10.

In decisional block S10, the diagnostic system 300 determines if the predetermined sampling cycle has passed since the last collection and storage of operational data (i.e., operational block S5). As mentioned above, in the preferred arrangement, the sampling cycle is approximately 1 minute. If the predetermined sampling cycle is not over, the diagnostic system 300 preferably loops back to decisional block S6 thereby repeating steps S6–S9. If the predetermined sampling cycle has passed, the diagnostic system 300 loops back to decisional block S5 and steps S5–S9 are repeated. As mentioned above, the record time period is approximately 14 minutes. As such, if thirteen minutes (i.e., 13 sets) of operational data are already stored, the diagnostic system will assign the new data the value 0 and reassign the more recently store operational data. In this manner, the newest 13 minutes of operational data will always be stored.

If it is not time to collect data, the diagnostic system 110 loops back until it is time to collect data. In the preferred embodiment, the diagnostic system 110 collects data at fixed time intervals (e.g., approximately one minute intervals). Accordingly, the diagnostic system 110 of the illustrated embodiment loops back through blocks S5–S10 for approximately one minute before moving on to operational block S4.

In this manner, the most recent time period of operational data can be preserved (i) when the engine stops running (decisional block S6), (ii) when a failure is detected (decisional block S7) and (iii) when the record switch 328 is activated (decisional block S9). As mentioned above, the operational data preferably is stored in the third memory storage device 314, which, as mentioned above, is preferably a non-volatile memory device, such as, for example, an EEPROM-type of memory device.

The operational data collected by diagnostic system 300 and stored in the third memory device 314 can be used by a technician or an engineer to diagnose engine problems or performance. To access the operational data that is stored in the third storage device 314, the engineer or technician can connect the computer 304 (see FIG. 4) to the ECU 108, with the communication connector 318. As mentioned above, the computer preferably is a notebook-type personal computer, which can be transported to the location where the outboard motor 50 is being used and/or serviced.

With reference to FIG. 4, the computer 304 preferably is configured with an input/output interface 410 for retrieving (i.e., communicating and uploading) the operational data collected by the ECU 108 and for outputting commands to the ECU 108. More specifically, the computer 304 includes an interactive computer program that is stored in the computer memory. The computer program can be configured to retrieve data periodically or to retrieve data when a menu option is chosen. Alternatively, the computer program can retrieve data in a large batch and store the retrieve data in a memory storage device 412 of the computer 304.

The computer 304 preferably also includes memory 414 for storing comparison data, which preferably is specific to the type of engine being diagnosed. Preferably, the comparison data represents "normal" operational data for the type of engine being diagnosed. This normal operational data can be compared to the operational data collected by the ECU 108 so as to determine when the engine is operating abnormally. In this manner, engine problems and/or mismatches between the engine and the watercraft can be diagnosed, for example.

The computer 304 preferably also includes a display interface 416 for allowing the technician or engineer to view the comparison data in a variety of formats, which are preferably chosen through menu that is displayed on the video display 330. The comparison data for the type of engine being diagnosed can be determined by the computer 304, which can identify the engine type from the engine identification information stored in the third storage device 314 of the ECU 108. In a modified arrangement, the technician or engineer can input the engine identification information into the computer 304.

Figure 6:
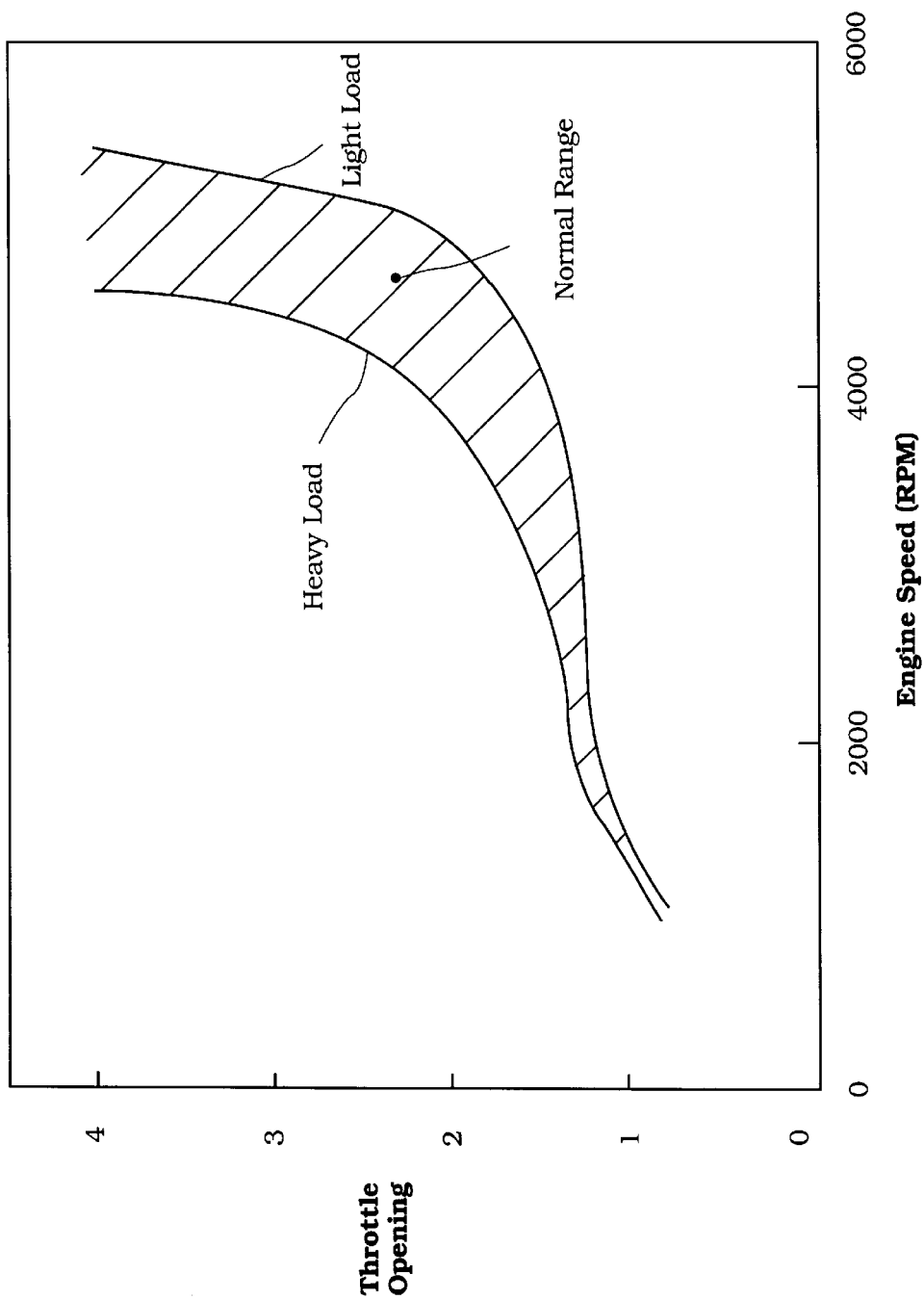
FIG. 6 is a graph of the conceptual relationship between engine speed and throttle valve opening.

FIGS. 6–9 are examples of the manner in which comparison data can be displayed. FIG. 6 shows a conceptual relationship between the throttle opening (indicated by the voltage from the throttle valve position sensor 254) and the engine speed. As the Figure indicates, the engine speed generally increases as the throttle valve is opened. At approximately 4000 RPM, the engine speed abruptly increases because the watercraft begins to plane, which causes the load on the watercraft to decrease. In the planing state, if the operational data lies to the right of the normal range (i.e., engine speed is too high), the cruising load (i.e., the planing load of the watercraft) is to light. This can indicate that there is a mismatch between the outboard motor 50, the propeller 70 and the watercraft. For example, the watercraft may be too light or the propeller too small. The technician or engineer can use this information to make adjustments to the outboard motor, propeller, and/or watercraft. In a similar manner, if the operational data lies to the left of the normal range (i.e., engine speed is too slow), the cruising load is too heavy. This can indicate, for example, that the watercraft is too heavy or that the propeller is too big.

Figure 7:
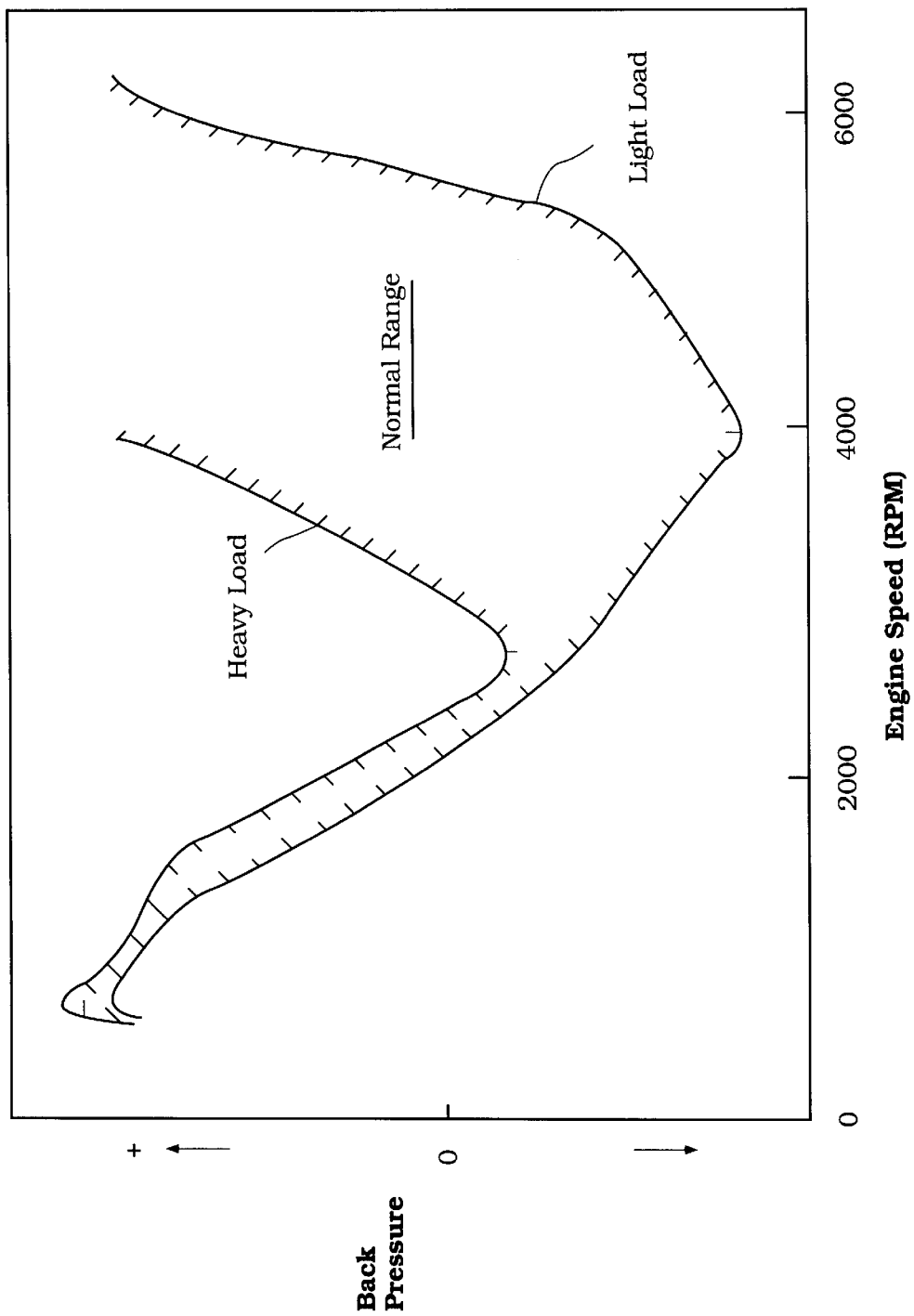
FIG. 7 is a graph of the conceptual relationship between engine speed and exhaust back pressure.

FIG. 7 shows a conceptual relationship between the back pressure and the engine speed. As with FIG. 6, FIG. 7 can also be used for determining if the load is too light or heavy for the outboard motor 50. In general, when the engine speed is low, the back pressure is positive. As the engine speed elevates and the speed of the watercraft increases, the back pressure decreases and may become negative. The decrease in back pressure typically is caused by the reverse flow over the exhaust discharge 214. Once the watercraft reaches planning speed (approximately 4000 RPM), the back pressure tends to increase and can become positive because of the increased flow of exhaust gas. During planing conditions, when the back pressure deviates to the negative side relative to engine speed (i.e., in the right hand corner of FIG. 7), the speed of the watercraft increases too fast relative to engine speed. This indicates that the cruising load is too small. On the other hand, when the back pressure deviates to the positive side (i.e., above the normal range), the speed of the watercraft is too slow relative to the engine speed. This indicates that the cruising load is too large. As such, the information from FIG. 7 also can be used with the operational data collected by the ECU 108 to properly match the outboard motor 50, the propeller 70 and the watercraft.

Figure 8:
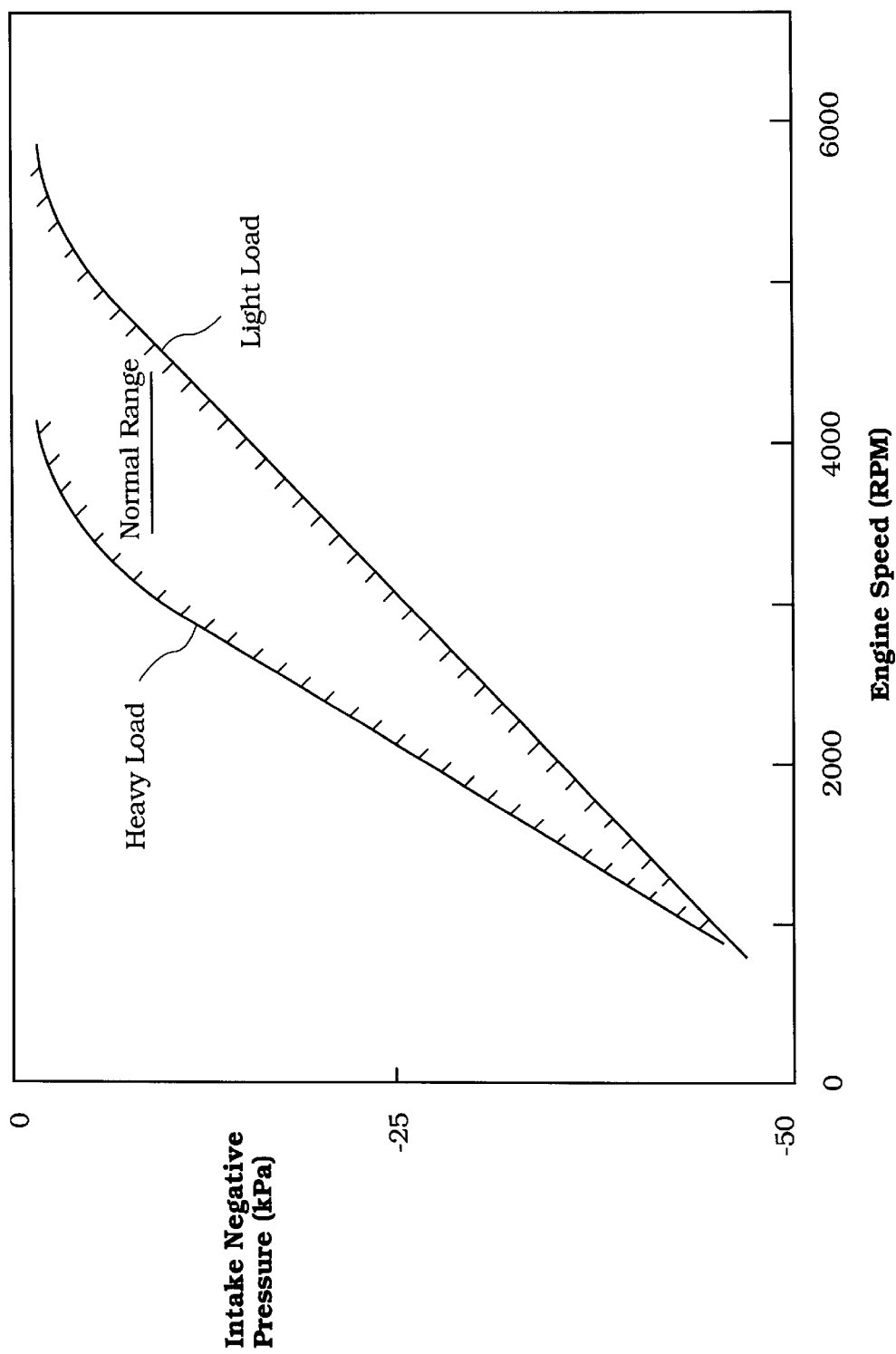
FIG. 8 is a graph of the conceptual relationship between engine speed and intake air pressure.

FIG. 8 shows the conceptual relationship between the intake air negative pressure (i.e., vacuum) and the engine speed. As shown in this Figure, the intake air pressure tends to increase as engine speed increases then the air pressure levels out as the engine reaches planning speeds (i.e., approximately 4000 RPM). As with FIGS. 6 and 7, FIG. 8 can be used to properly match the outboard motor 50, the propeller 70 and the watercraft. For example, if the cruising load is too small, the intake pressure typically is below the normal range during planing. In contrast, if the cruising load is too large, the intake pressure typically is above the normal range during planing. In a similar manner, the relationship of air/fuel ratio to engine speed can also be used to match the outboard motor because the air/fuel ratio is dependent upon the intake air pressure. The air/fuel ratio can be determined from the air/fuel sensor 263 or derived from the fuel and air flow rates into the combustion chamber.

Figure 9:
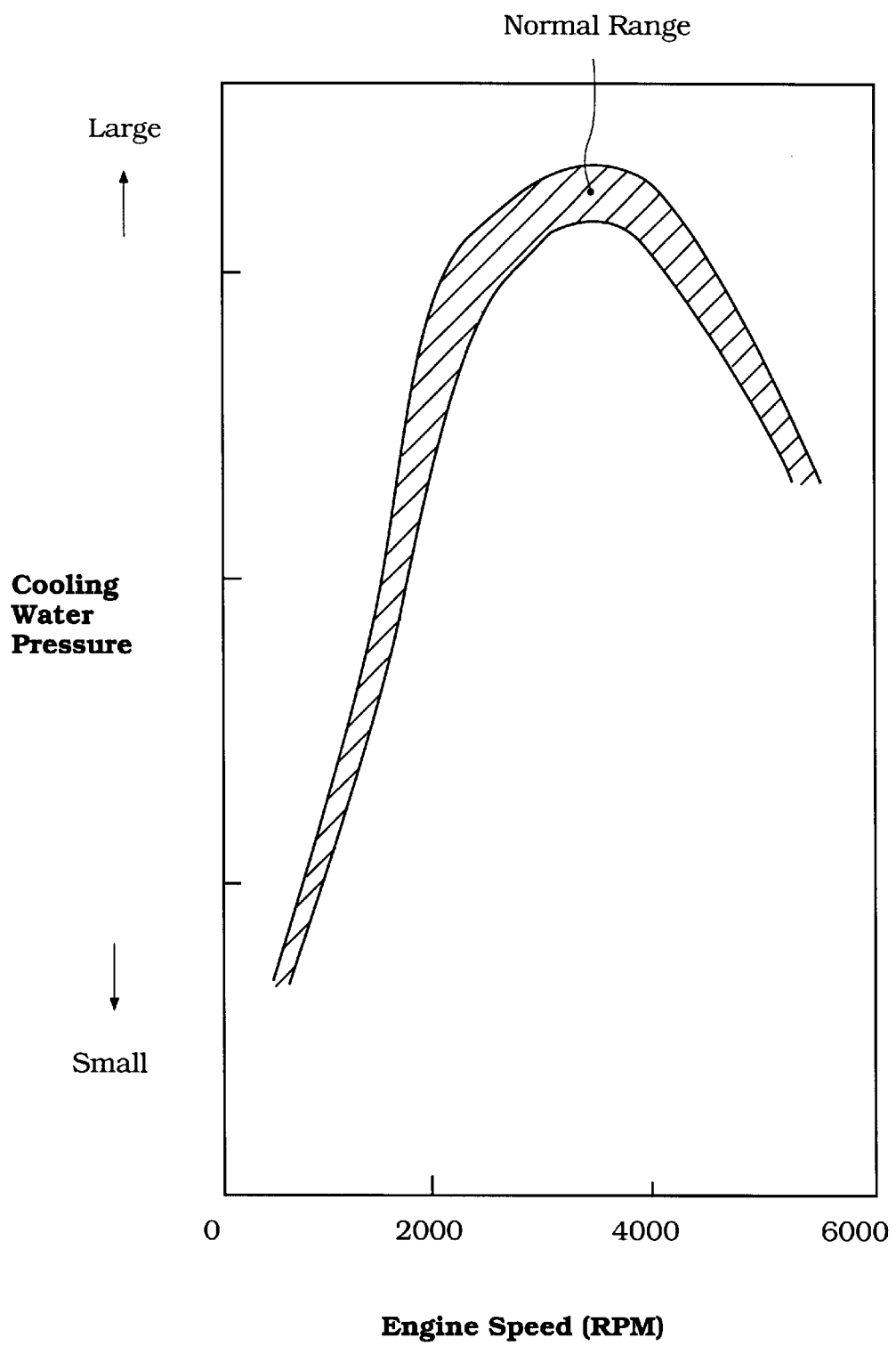
FIG. 9 is a graph of the conceptual relationship between engine speed and cooling water temperature.

FIG. 9 shows the conceptual relationship between the cooling water pressure and the engine speed. As shown in this Figure, the cooling water pressure tends to increase until the watercraft reaches a planing speed (i.e., approximately 4000 RPM). If the water pressure deviates from the normal range, it indicates a potential abnormality and/or failure in the cooling system. For example, if the cooling water pressure is higher or lower than the normal range, there may be a failure in the thermostat 226 or they may be debris stuck in the cooling system. If the cooling water pressure is lower only when the engine is operating at medium to high speeds, this may indicated that the impeller (not shown) for the water pump 210 is worn out or that the coolant-inlet 212 is clogged.

It should be appreciated that comparison data, such as the comparison data described above, can also be provided in a manual, which can be referenced by the technician or engineer. However, in the preferred arrangement, the comparison data is stored within the computer 304.

Preferably, the display interface 416 also allows the technician or engineer to view the operational data that was collected by the ECU 108 in a variety of formats, which can be chosen by the technician or engineer through a menu type format. For example, FIG. 10 illustrates a display of various operational data in a tabular format. Specifically, each row represents a sampling cycle. In the preferred arrangement, there are thirteen sampling cycles and thus there are thirteen rows in FIG. 10. The columns represent specific operational data, which, from left to right, include: engine speed, fuel pressure, battery voltage (V), air/fuel ratio as indicated by the air/fuel sensor 263, throttle valve position as indicated from the voltage of the throttle position sensor, and cooling water temperature in degrees. Preferably, through the menu type format, the technician or engineer can choose to display different, less, and/or additional operational values in this tabular format.

In the upper rows of FIG. 10, the exemplary operational data was recorded when the engine speed was relatively high, such as when the watercraft was on plane. In the lower rows, the operational data was recorded when the engine speed was relatively low. This indicates that the engine was either idling or that the watercraft was traveling at a lower speed.

The operational data in the fourth, fifth, and sixth minutes can be considered stable because the engine speed stays relatively constant (i.e., between 4600–4800 RPM). From this data, the fuel pressure, the battery voltage, the air/fuel ratio the throttle opening and the cooling-water temperature can be compared to the engine speed. For example, some of this data can be compared to the comparison data of FIGS. 6–9 so as to match the outboard motor 50 to the watercraft.

The fuel pressure during this stable condition can also reveal information about the quality of the rigging in the fuel system. For example, if the fuel pressure fluctuates or drifts during the stable state this can indicate to a technician or engineer that the fuel rigging is improper (e.g., the fuel hoses are too long or too small, the fuel filters are clogged or the fuel tank 120 is too low with respect to the motor 50). The technician or engineer can also compare the fuel pressure to normal data for the type of engine to diagnose problems with the rigging.

The relationship between the battery voltage and the engine speed can also be used to diagnose problems with the outboard motor 50. For example, the power-generation capability of the generator fluctuates with engine speed. In general, as the engine speed increases, the generator creates more power and as the engine speed decreases, the generator creates less power. This general relationship can be checked by examining the data in FIG. 10. The battery voltage can also be compared to the normal range of battery voltages, which can be stored in the third memory storage device 314. If the battery voltage is lower than the normal range at stable high engine speeds, this may indicate to the engineer or technician that too much electrical power is being consumed by one or more electrical instruments on the hull side relative to the power generation capability of the outboard motor 50. If the battery voltage is below the normal range even at low engine speeds, this may indicate that the power generation may be inefficient at high engine speeds or there may be a faulty connection between the battery and the generator.

The relationship between the cooling water temperature and the engine speed can also be used to diagnose the outboard motor 50. The cooling water temperature typically starts at a low temperature when the engine is first turned on. As the engine runs over longer time periods, the cooling water temperature should lie within a relatively constant range. If the cooling water temperature does not stay fairly constant, this would indicate an abnormalities in the cooling system. The steady state cooling water temperature can also be compared to normal values, which are preferably stored in the computer 304. If the steady state cooling water temperature is higher than the normal range when the engine is running at medium to high speeds, this can indicate that not enough cooling water is being circulated through the cooling system (e.g., a clogged passage or faulty pump). If the steady state cooling water temperature is lower than the normal range especially at low speeds, this may indicate that too much cooling water circulates through the cooling system. This can be caused by a faulty thermostat.

Preferably, the display interface 416 also allows the technician or engineer to view the operational data that was collected by the ECU 108 in a graphical format. More preferably, the menu provides the technician or engineer with the option of plotting different operational values against each other so that the technician or engineer can view the relationships between various operational data. Most preferably, the options are specific to the type of engine being diagnosed.

Figure 11:
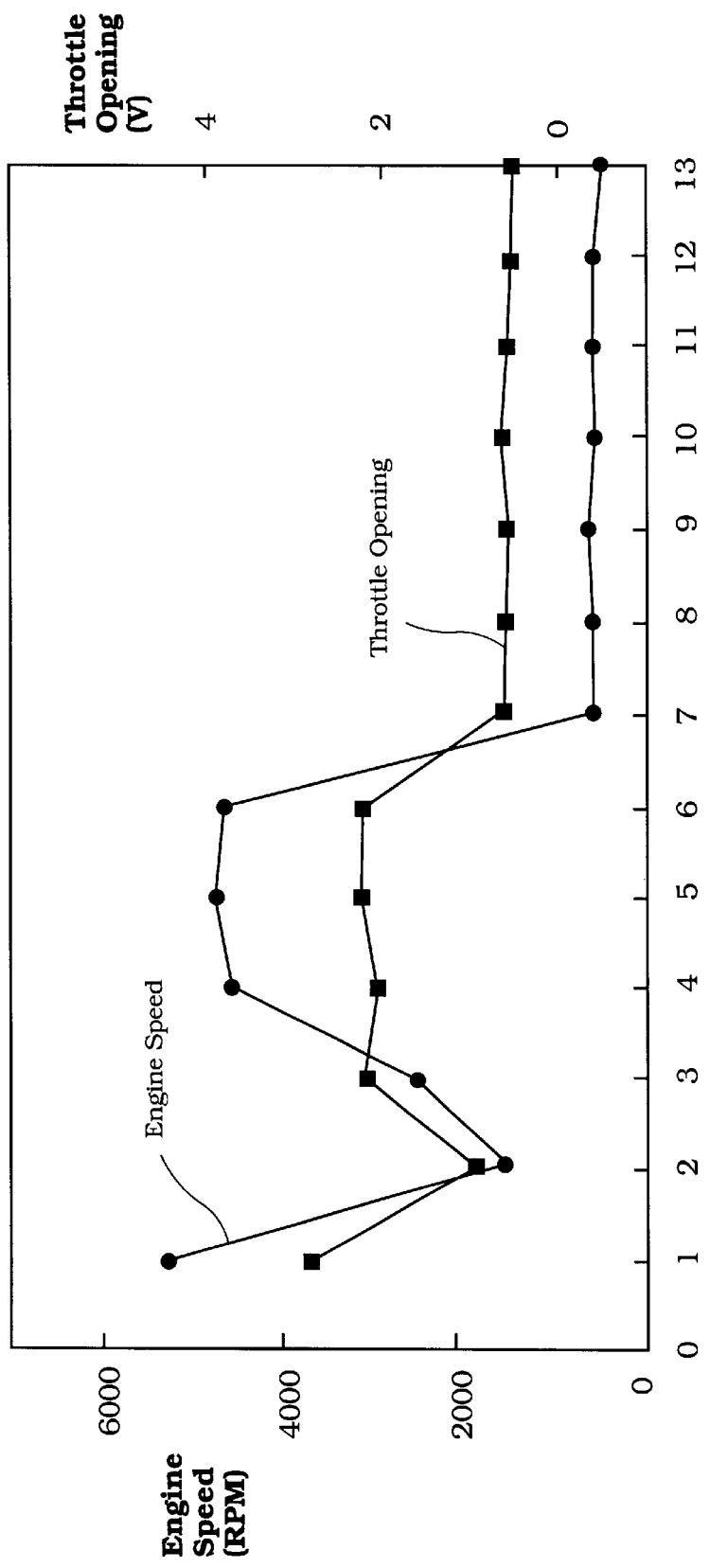
FIG. 11 is a graph that can be displayed on the display screen of FIG. 4.

FIG. 11 is an example of a graph that can be displayed. This graph shows the sequential change of the relationship between the engine speed and the throttle opening through the recorded time period. From FIG. 11, the technician or engineer can deduce that the watercraft is in a steady state planing state from the third sampling cycle to the sixth sampling. The technician or engineer can then analyze the engine speed and throttle valve relationship as described above.

Figure 12:
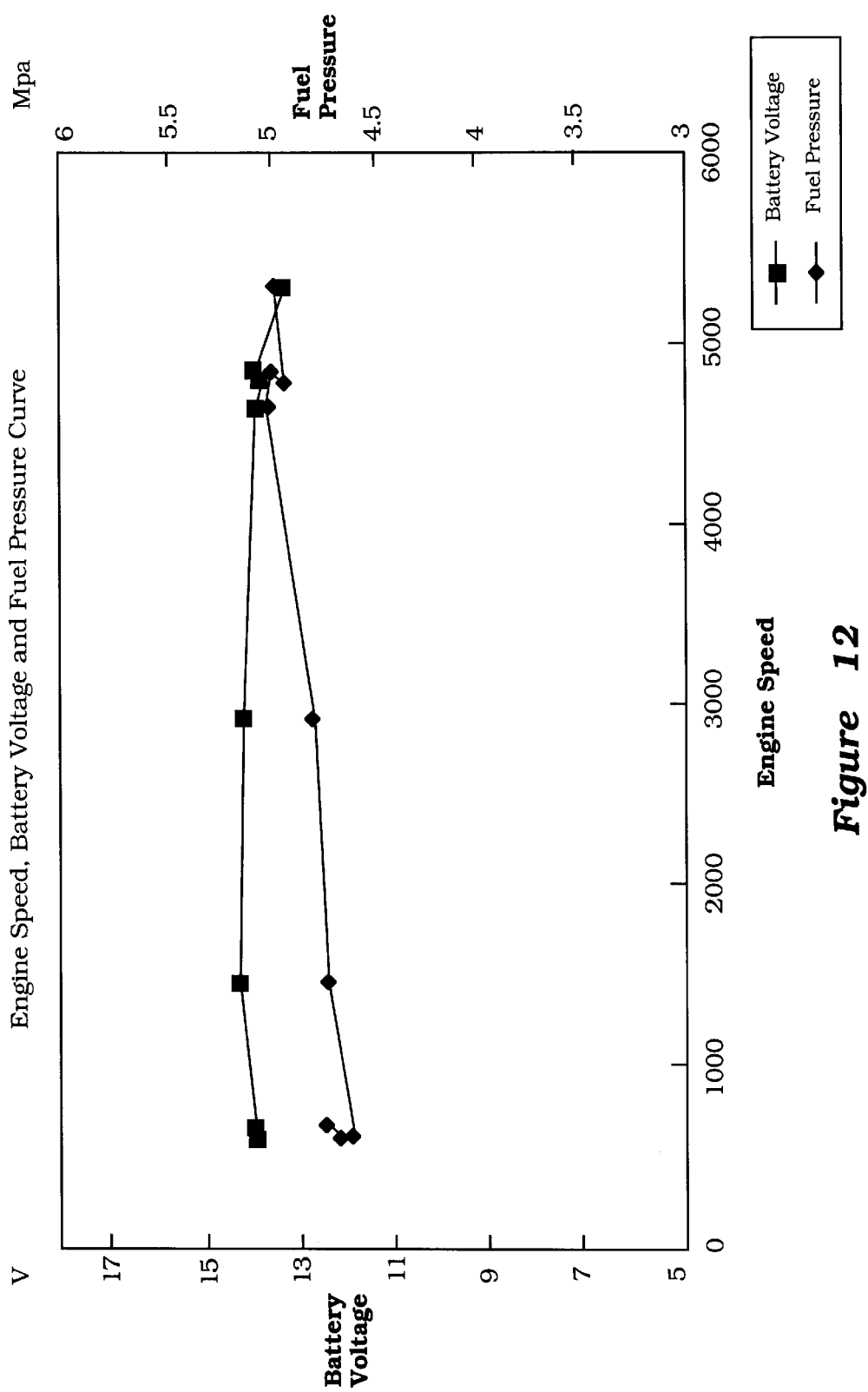
FIG. 12 is another graph that can be displayed on the display screen of FIG. 4.

FIG. 12 is another example of a graph that can be generated by the engine diagnostic system 300. This graph shows the relationship between three operational data—engine speed, battery voltage and fuel pressure. This graph can provide the technician or engineer valuable information. For example, because the battery voltage stays relatively constant for all engine speeds, the technician or engineer can determine that the rigging for the electrical system is proper. In a similar manner, the relatively constant fuel pressure indicates that the fuel rigging is also proper.

Figure 13:
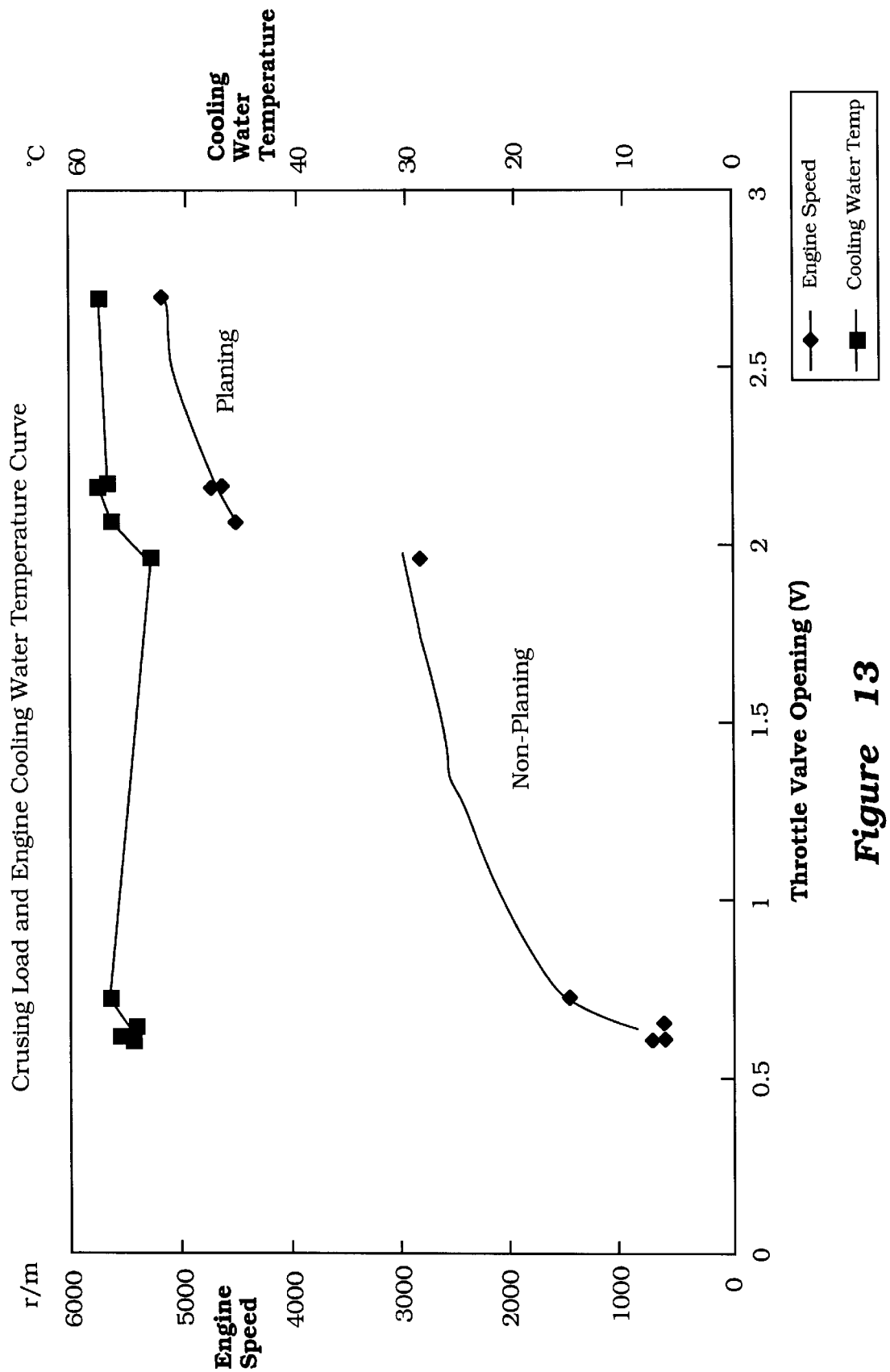
FIG. 13 is yet another graph that can be displayed on the display screen of FIG. 4.

FIG. 13 is yet another example of a graph that can be generated by the engine diagnostic system 300. This graph shows the relationship between engine speed, throttle valve opening and cooling water temperature. From this graph, the technician or engineer can detect the when the watercraft is planing, which is indicated by the large jump in engine speed versus throttle valve position. Once the planing state is identified, the technician or engineer can compare the engine speed and throttle valve position as described above. The graph also indicates the cooling water temperature during the non-planing state and the planing state. This information can also be used to diagnose the engine.

The engine diagnostic system 300 preferably is also configured to display the failure detection data. An example of an output format for the failure detection data is illustrated in FIG. 14. As explained with reference to FIG. 5, a failure is indicated when the output value from the various signals show a clear abnormal value (i.e., below/above a preset value). When such a failure is indicated, the data from the various sensors is stored in the ECU 108. The computer 304 preferably is configured to retrieve this data as indicated in FIG. 14. In FIG. 14, the failure record of the various sensors indicates that the sensors have not failed.

The engine diagnostic system 300 preferably can also display the present values of the operational data as shown in FIG. 15. As such, the engine can be operated and the technician or engineer can view in real time the values of the operational data and diagnose the outboard motor 50 while it is being operated. The engine diagnostic system 300 also includes the ability to test the spark plugs 111 by having the ECU 108 send a pseudo signal to the spark plug 111 to determine whether or not the ignition is normal. The diagnostic system 300 preferably also includes the ability to perform a cylinder test, which comprises the computer 304 directing the ECU 108 to disable one of the cylinders while the engine 58 continues to run. If there is no change in the engine speed RPM, the technician or engineer can determine that the cylinder is not functioning properly.

Figure 16:
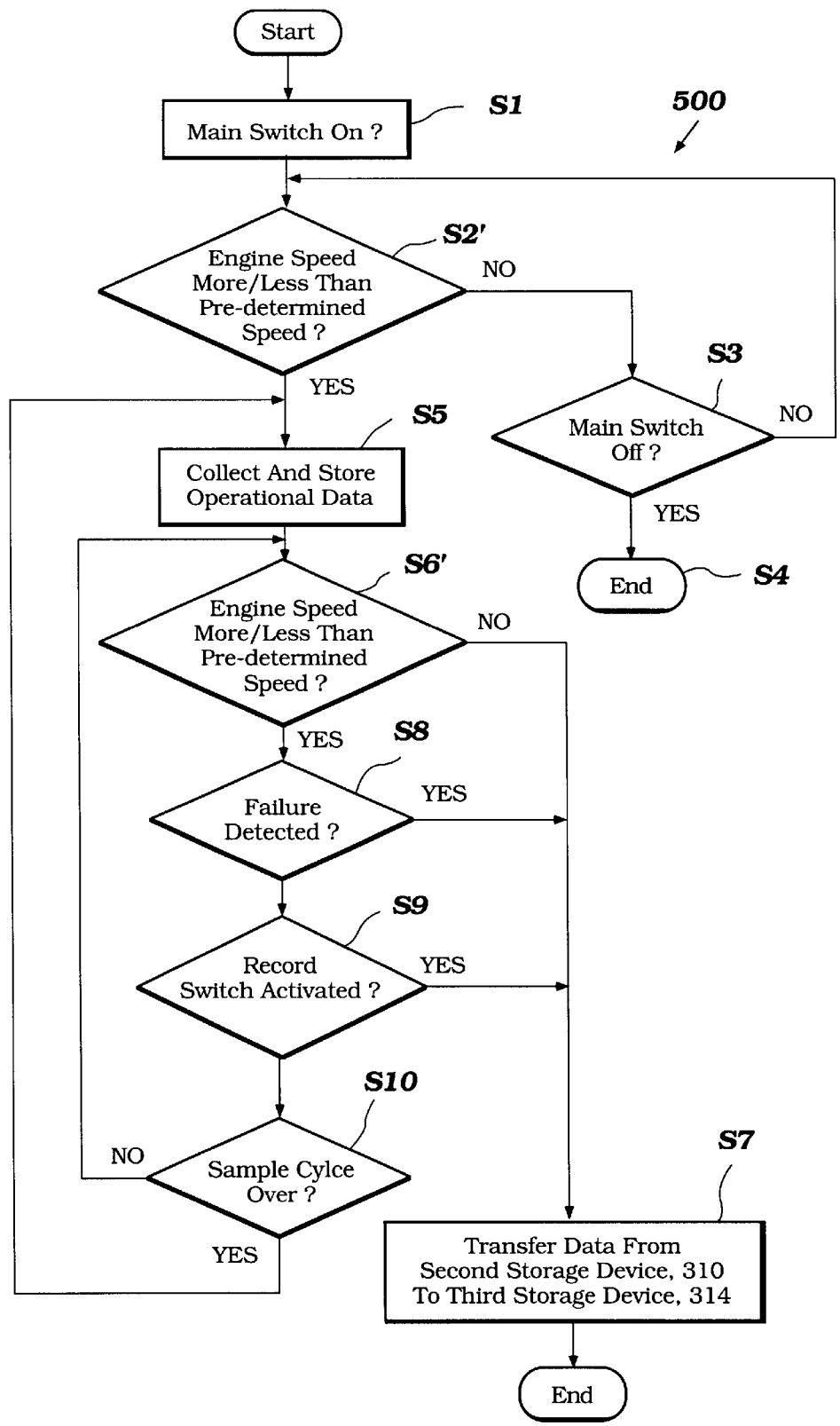
FIG. 16 is a flow diagram of another subroutine that can be used with the ECU of FIG. 1.

It may be advantageous to record operational data only under certain conditions, such as, for example, when the engine speed is above/below a predetermined value. FIG. 16 illustrates a subroutine 500 for collecting the operational data only when the engine speed is above/below a predetermined value. Subroutine 500 is substantially similar to subroutine 400. The main difference involves decisional blocks S2' and S6'. In these decisional blocks, the diagnostic system 500 determines if the engine speed is more or less than a predetermined value. In this manner, the diagnostic system can be configured to collect operational data only when the engine speed is higher than an idling speed (e.g., 1000 RPM) or when the engine is at or near a planing speed (e.g., greater than 3000 RPM).

Figure 17:
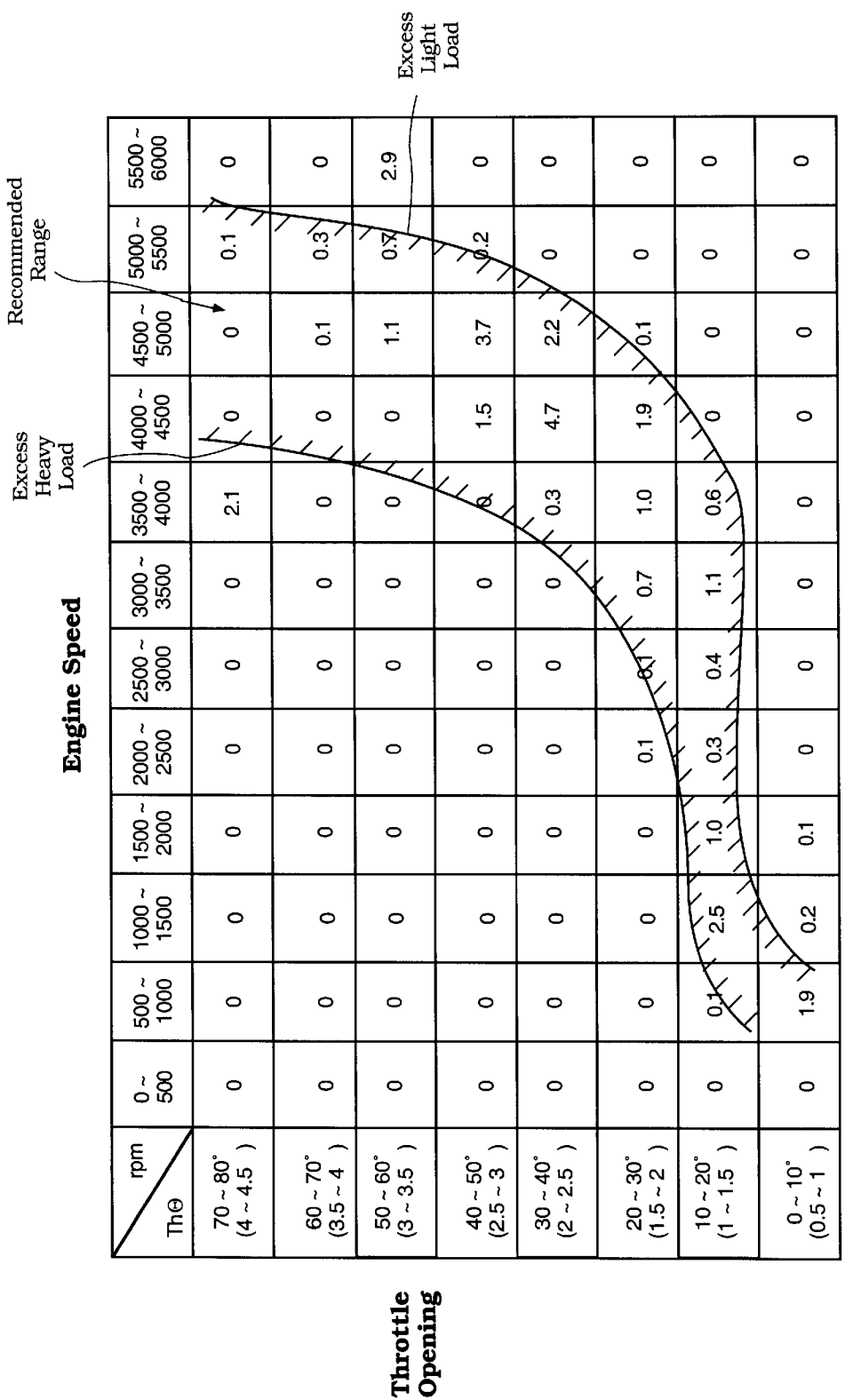
FIG. 17 is a graph of data that can be displayed on the display screen of FIG. 4.

FIG. 17 is another example for displaying the data collected by the engine diagnostic system 300. This graph illustrates the accumulated operating time (in hours) at specific operational conditions. The operational conditions, in the illustrated arrangement, are defined by two operational data values: throttle valve position (V) and engine speed (RPM). However, it should be appreciated that the operational conditions can be defined more or less than two variables and may be defined by other operational data. The operational conditions preferably are divided into operational groups, which preferably are uniform. In the illustrated arrangements, the operational groups are defined by dividing the engine speed into increments of 500 RPM and dividing the throttle valve position into increments of 0.5 Volts (i.e., approximately 10 degrees). The graph indicates the accumulated operating time at each operational condition. The graph preferably is overlayed with information that indicates the normal operating conditions, which are preferably stored within the computer 304 and indicated by the engine identification information in the ECU 108. In this manner, the technician or engineer can determined if and for how long the outboard motor is operating outside of normal conditions. For example, FIG. 17 indicates that the outboard motor was operating at an operational condition of 3500–4000 RPM with a throttle opening of 70–80 degrees for approximately 2.1 hours. FIG. 17 also indicates that this operational condition is outside the recommended range and indicates a heavy load. In a similar manner, FIG. 17 indicates that the outboard motor was operating at an operational condition of 5500–6000 RPM with a throttle opening of 50–60 degrees for approximately 2.8 hours. This is also outside the recommend range and indicates to the technician or engineer that the load on the outboard motor was too light.

Figure 18:
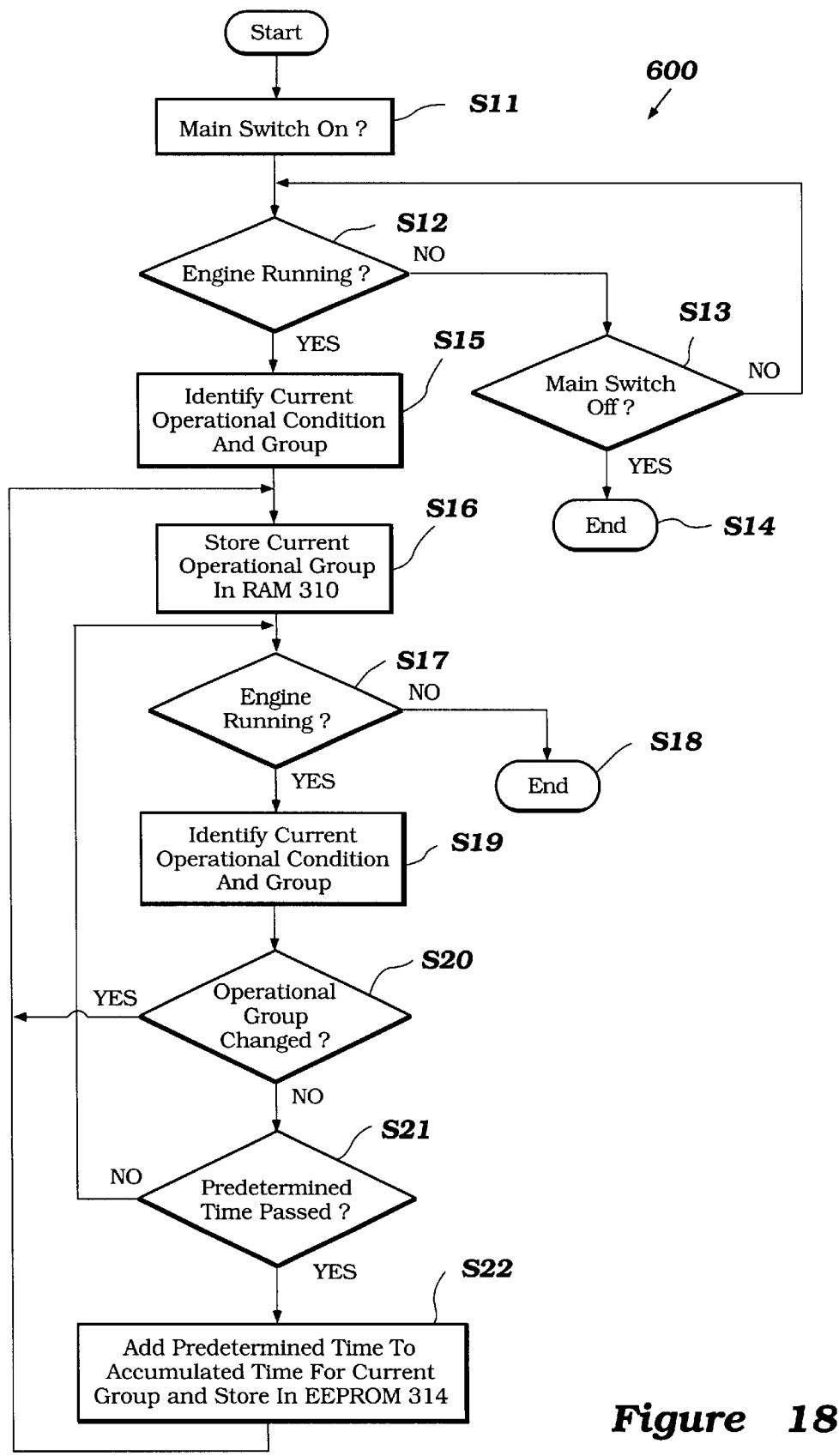
FIG. 18 is a flow diagram of yet another subroutine that can be used with the ECU of FIG. 1.

FIG. 18 illustrates a control subroutine 600 of the engine diagnostic system 300 that can be executed by the ECU 108 for determining the accumulated operating time an operational condition, such that a chart such as that illustrated in FIG. 17 can be derived. As represented by operational block S11, the subroutine 600 first initializes, preferably, when a main switch, such as, for example, an ignition starting device (e.g., a key activated switch) is activated. As represented by decisional block S12, the diagnostic system 300 determines if the engine 58 is running. This can be determined from the pulses sent by the crank angle position sensor 258. If the engine 58 is not running, the diagnostic system 600 determines if the main switch is off as represented by decisional block S13. If the main switch has not been turned off, the routine 600 loops back to decisional block S11. If the main switch has been turned off, the subroutine 600 ends as indicated by operational block S14.

If the engine is running, the diagnostic system 300 identifies the current operating condition and operational groups. As explained above, the current operation condition is defined by one or more operational data, which are divided into operational groups. After the current operational group is identified, the identification of the group is stored in the RAM 310 of the ECU 108 as indicated by operational block S16.

In operational block S17, the diagnostic system 300 determines if the engine 58 is running, preferably as described above. If the engine is not running, the subroutine stops as indicate by operational block S18. If the engine is still running, the diagnostic system again identifies the current operating condition and operational group as indicated by operational block S19. The diagnostic system 300 then determines if the operational group has changed (decisional block S20). If the operational group has changed, the diagnostic system loops back to operational block S16 and stores the new current operational group in the RAM 310 of the ECU 108. If the operational group has not changed, the diagnostic system then determines if a predetermined amount of time has passed (decisional block S21. Preferably, the predetermined about of time is approximately 30 seconds. If the predetermined amount of time has not passed, the diagnostic system 300 loops back to decisional block S17. If the predetermined amount of time has passed, the diagnostic system 300 adds the predetermined amount of time to the accumulated operation time, which is stored in the third memory device 314, (e.g., EEPROM) of the ECU 108. The new accumulated operational time is then stored in the third memory device 314 and the diagnostic system 300 loops back to operational block S16.

With the data provided by the diagnostic system 300, a technician or engineer should be able to diagnose most engine malfunctions. However, the technician or engineer may be inexperienced or the engine malfunction may be particularly complicated. In such a case, it is desirable for the technician or engineer to employ the help of an expert or an experienced engineer or specialist, such as, for example, an engineer from the manufacturer of the outboard motor 50.

Accordingly, as explained above, the computer 304 can be connected to a server computer 344 through a network line 346, such as, for example the internet (see FIG. 4). The server 344, in turn, preferably is connected by communication cables to one or more terminal computers 700, 702 at which one or more specialists can analyze the data downloaded from the computer 304 to the server computer 344. The data can be sent from the computer to the server over an internet connection, a cable connection and/or a telephone/cellular/modem connection. Moreover, the computer 304 and the server 344 can be configured such that the specialist can view the data on the terminals 700, 702 at substantially same time the technician or engineer is viewing the same data on the computer 304. The data can also be transferred by downloading the data to a storage medium and physically transferring the storage medium to the server 344.

Once the data is transferred to the server 344, the more experienced engineer or specialist, can access and view the data collected and/or or stored by the engine diagnostic system 300 and diagnose the engine and/or provide information for better matching the outboard motor 50 to the watercraft.

To facilitate the transfer and analysis of the data, the server 344 preferably includes an input/output interface 704, memory 706 for storing the operational data, memory 708 for the address of the terminal computers 700, 702, memory 710 for storing comparison data, and a terminal interface 712 for displaying/receiving the data on the terminals 700, 702.

Figure 19:
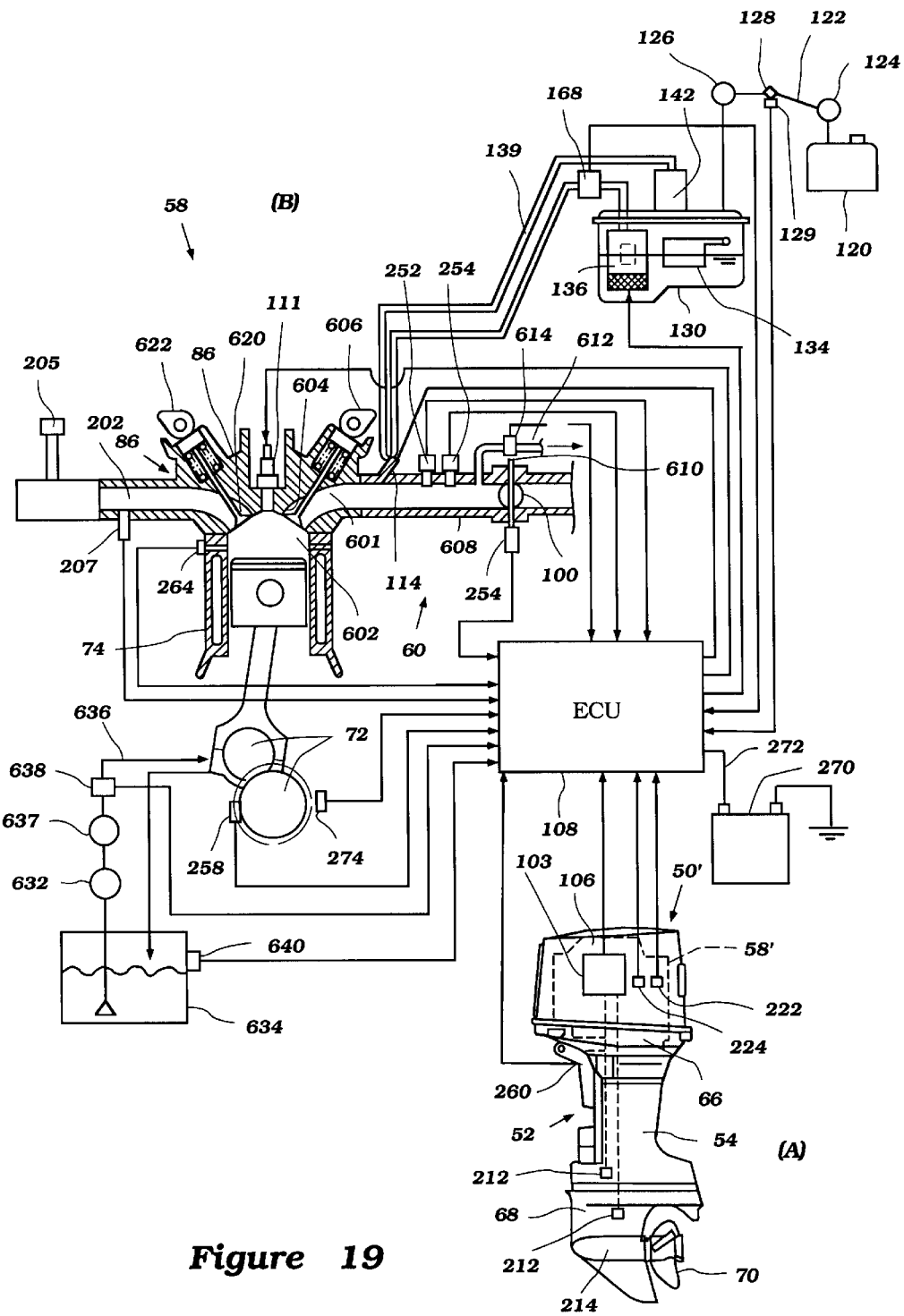
FIG. 19 is a multi-part view showing: (A) in the lower right hand portion, a side elevation view of a modified arrangement of an outboard motor employing certain features, aspects and advantages of the present invention; (B) in the upper view, a partially schematic view of the engine of the outboard motor with its induction and fuel injection system shown in part schematically.

The diagnostic system 300 was described above in the environment of an outboard motor 50 that is powered by a two-cycle engine 58. However, as mentioned above, the diagnostic system 300 can also have utility in a variety of other environments of use. For example, FIG. 19 illustrates an outboard motor 50' that is powered by a four-cycle engine 58'. For the sake of brevity and because many of the components of the outboard motor 50 of FIG. 1 and the outboard motor of FIG. 19 are similar, only the major differences between four-cycle engine of FIG. 19 and the two cycle engine of FIG. 1 will be described. As such, components that are similar and/or the same in the two Figures have been labeled with the same reference numbers and descriptions of these components can be found above.

As shown in FIG. 19, an intake passage 601 is defined through a portion of the cylinder head assembly 86. In some arrangements, more than one intake passage 601 may be defined through the cylinder head assembly 86 into the combustion chamber 602. An intake control valve 604 can be designed to control the flow of intake air through the passage 601 into the combustion chamber 602. Movement of the intake valve 604 is controlled, in the illustrated arrangement, with a cam shaft 606. Such arrangements are well known to those of ordinary skill in the art.

Air preferably is inducted into the induction system through an air intake box (not shown). The air drawn into the air intake box is passed to the combustion chamber 602 via a set of intake pipes 608. The intake pipes 608 extend between the air box and the associated intake passages 601 for each individual combustion chamber 602. Flow through the intake pipes 608 is controlled through the use of the throttle valve 100. In the illustrated arrangement, a number of throttle valves 100 are positioned on a single rod 610 and are controlled with a single actuator (not shown). The actuator controls the movement of the valves 100 about a rotational axis in response to changes in operator demand. The operator can change the positioning of the throttle valves 100 by operating an accelerator pedal or an accelerator lever in any manner well known to those of ordinary skill in the art. Of course, the throttle valves can be separately controlled or a single throttle valve can control the flow through the entire induction system. As with the two-cycle engine 58, the induction system 64 preferably includes an intake air pressure sensor 250 and an intake air temperature sensor 252, which are operatively connected to the ECU 108.

In the illustrated arrangement, a bypass passage 612 is provided between the intake box and the individual runners 608 extending to the cylinder head assembly 86. The bypass passage 612 preferably is designed to communicate with each of the illustrated intake runners 608. The bypass passage 612 opens into the individual runners 608 downstream of the throttle control valve 100 such that when the throttle control valves 100 are closed, air may be supplied to the intake runners 608 through the bypass passage 612 under the control of an idle speed control valve 614. In some arrangements, multiple valves 614 can be provided to correspond with the multiple runners 608. The idle speed control valve 614 can be opened and closed to vary the level of flow through the associated bypass passage 612.

The idle speed control valve 614 included an actuator such as a stepper motor, a solenoid or other suitable actuator mechanism. In the illustrated arrangement, the idle speed control valve actuator is connected to the ECU 108 such that the ECU 108 can control the position of the idle speed control valve. If the actuator is a stepper motor, the ECU 108 can deduce the position of the idle speed control valve 614 by keeping track of the movements in a known manner. In a modified arrangement, an idle speed control valve sensor can be included for sensing the position of the idle speed control valve 614.

In the illustrated arrangement, the fuel supply system draws fuel from a fuel tank 120 that preferably is positioned within the watercraft. The fuel is drawn from the fuel tank 120 through a supply line 122 with a first low pressure fuel pump 124. In some arrangements, the low pressure fuel pump 124 may be driven by pressure variations within the crankcase. The fuel is drawn by the fuel pump 124 and supplied to a fuel filter 128 in manners well known to those of ordinary skill in the art. In addition, fuel from the fuel filter 128 is drawn by a second low pressure pump 126 for deposit into a vapor separator 130, which preferably is arranged as described above.

A fuel pump 136 is provided within the vapor separator 130 to provide fuel from the vapor separator 130 to the engine for combustion. The is supplied under high pressure to a fuel injector 114. The fuel injector 114 in the illustrated arrangement is designed for indirect injection. That is, the fuel injector 114 injects fuel into the induction system at a location outside of the combustion chamber. In some arrangements, however, the fuel injector 114 may be disposed for injection directly into the combustion chamber.

Fuel may be bypassed from the fuel injector 114 through a return line 138. The return line 139 maintains a flow of fuel between the vapor separator 130 and the fuel injector 114. The flow of fuel decreases the influence of combustion heat generated within the combustion chamber upon the fuel and reduces vaporization of fuel. In addition, by returning the fuel to the vapor separator 130, the pressure of the fuel supplied to the fuel injector can be controlled. Of course, the fuel injector 114 can be controlled using the ECU 108 in a manner known to those of ordinary skill in the art. The fuel pressure sensor 168 preferably sends a signal to the ECU 106 indicating the fuel pressure at the fuel injectors 114.

Following combustion, the exhaust gases can be removed from the combustion chamber 602 through an exhaust passage 202 that extends from the cylinder head assembly 86. The exhaust passage 114 includes at least one exhaust port that is disposed in the cylinder head assembly 86 adjacent to the combustion chamber 602.

An exhaust control valve 620 controls the opening and closing of the exhaust port to allow exhaust gases to flow from the combustion chamber 602. The exhaust control valve 620 is opened and closed with an exhaust cam shaft 622 or in any other suitable manner. The exhaust gases then can be transferred from the exhaust passage 202 to the atmosphere or body of water in which the watercraft operating as described above or any other suitable manner.

Engine 58' of FIG. 19 includes a "closed" lubrication system 630. A lubricant pump 632, which is preferably driven by the crankshaft, draws lubricant from a lubricant reservoir 634. The lubricant from the reservoir 630 is provided to the engine 24 for lubrication through a supply line 636, which preferably includes a lubricant filter 637. Preferably, a variety of sensors are provided in a lubrication system to indicate an operational state of the lubrication system. For instance, in the illustrated arrangement, a pressure and/or sensor 638 is provided. A lubricant level sensor 640 preferably is also provided in the reservoir 630.

The engine 58' preferably also includes a suitable cooling system, such as the one arranged as described above with respect to FIG. 2.

The diagnostic system 300 for this arrangement preferably is configured as described above. However, in this arrangement, the operational data collected by the ECU 108 preferably includes at least (i) the lubrication pressure as sensed by the lubrication pressure sensor 638 and (ii) the position of the idle speed control valve 614 as determined by the ECU 108 or an idle speed control valve sensor. As such, the diagnostic system 300 can be used to display this operational data in a tabular format as shown in FIG. 20. By comparing the lubrication pressure and idle speed control valve position to the engine speed, the technician or engineer can determine if the induction system 64 and/or the lubrication system 630 is operating properly. Moreover, this data can also be compared to comparison data that is specific to the engine being diagnosed to aid the technician or engineer in matching the outboard motor 50' to the watercraft as described above.

Figure 21:
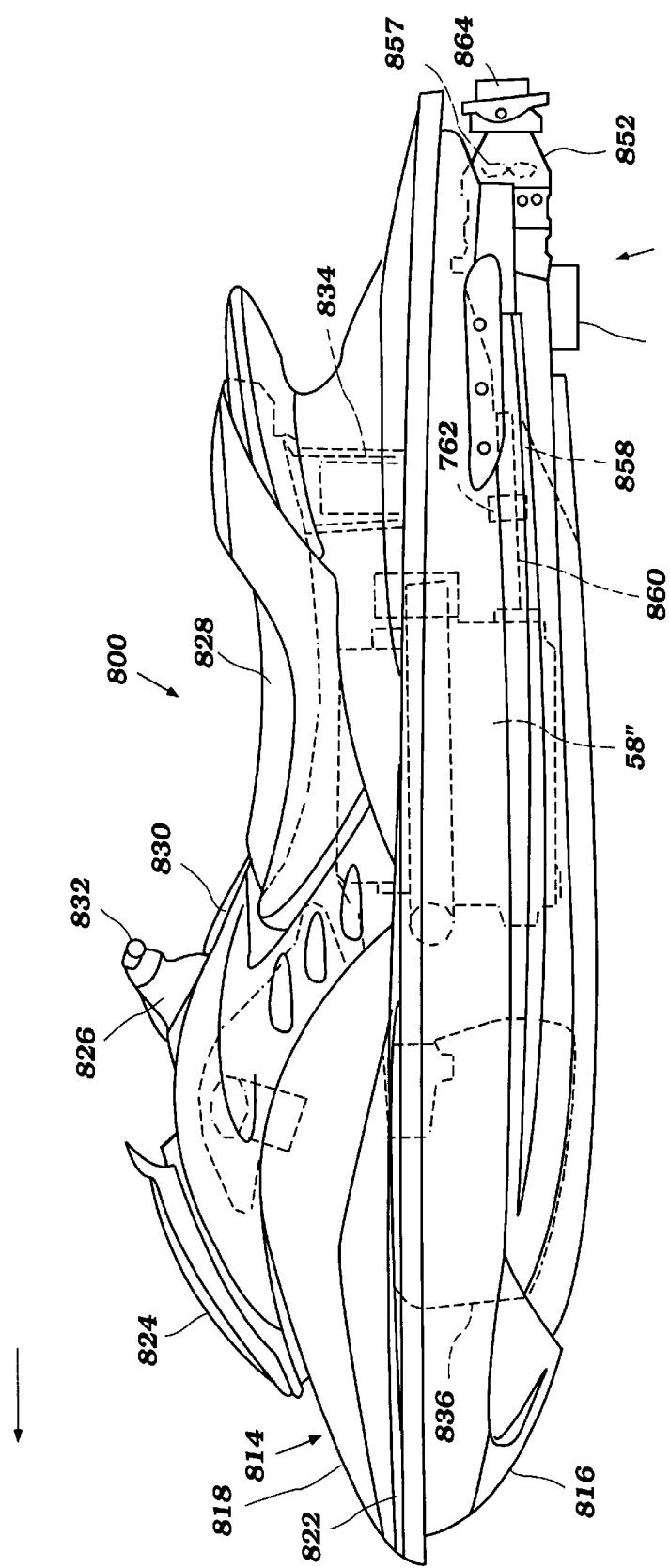
FIG. 21 illustrates a personal watercraft having certain features, aspects and advantages of the present invention.
Figure 22:
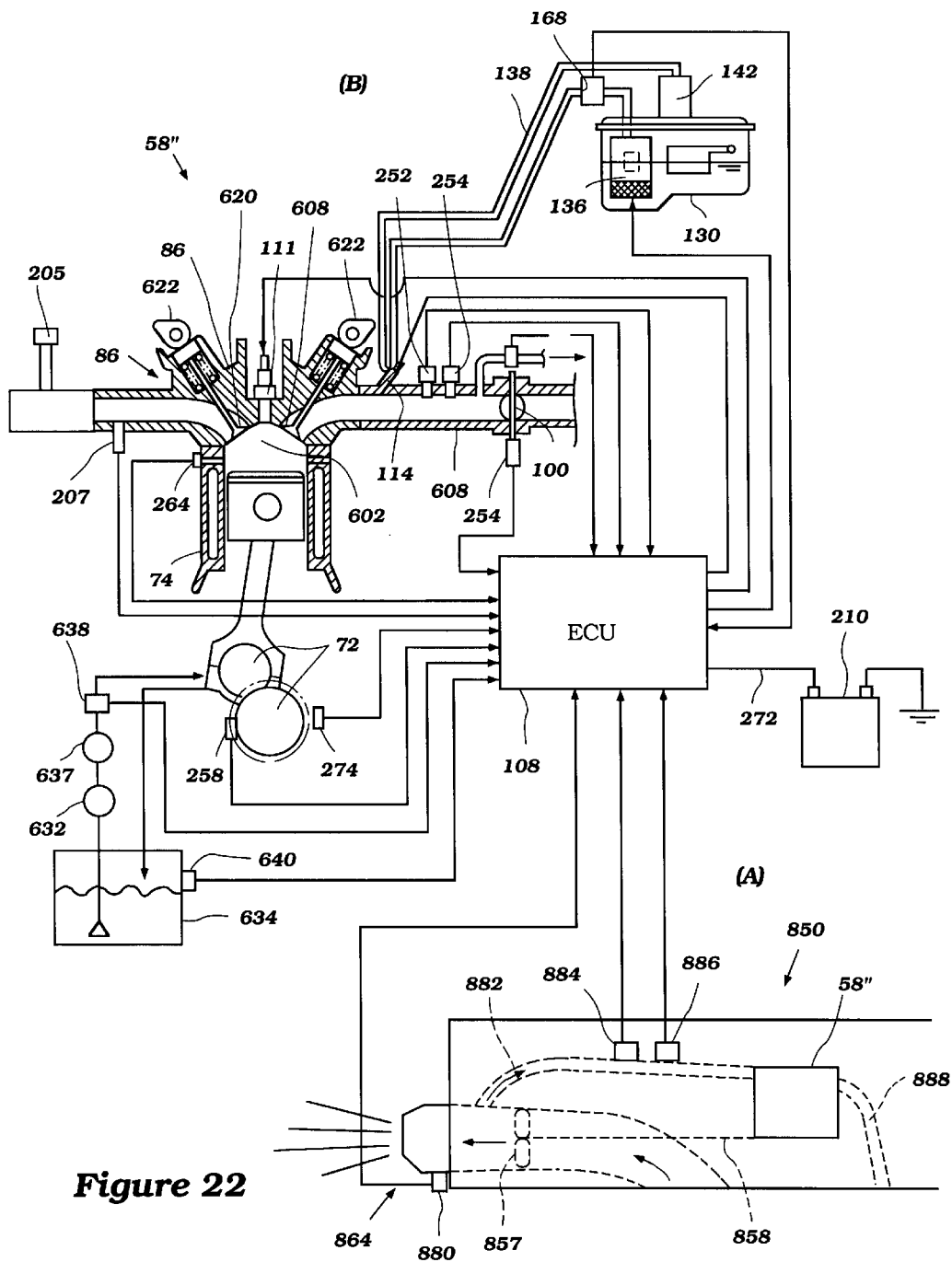
FIG. 22 is a multi-part view showing (A) in the lower right hand portion, a schematic side elevation view of a pump unit of the personal watercraft of FIG. 21, and (B) in the upper view, a partially schematic view of the engine of the personal watercraft with its ECU, induction and fuel injection system shown in part schematically.
Figure 23:
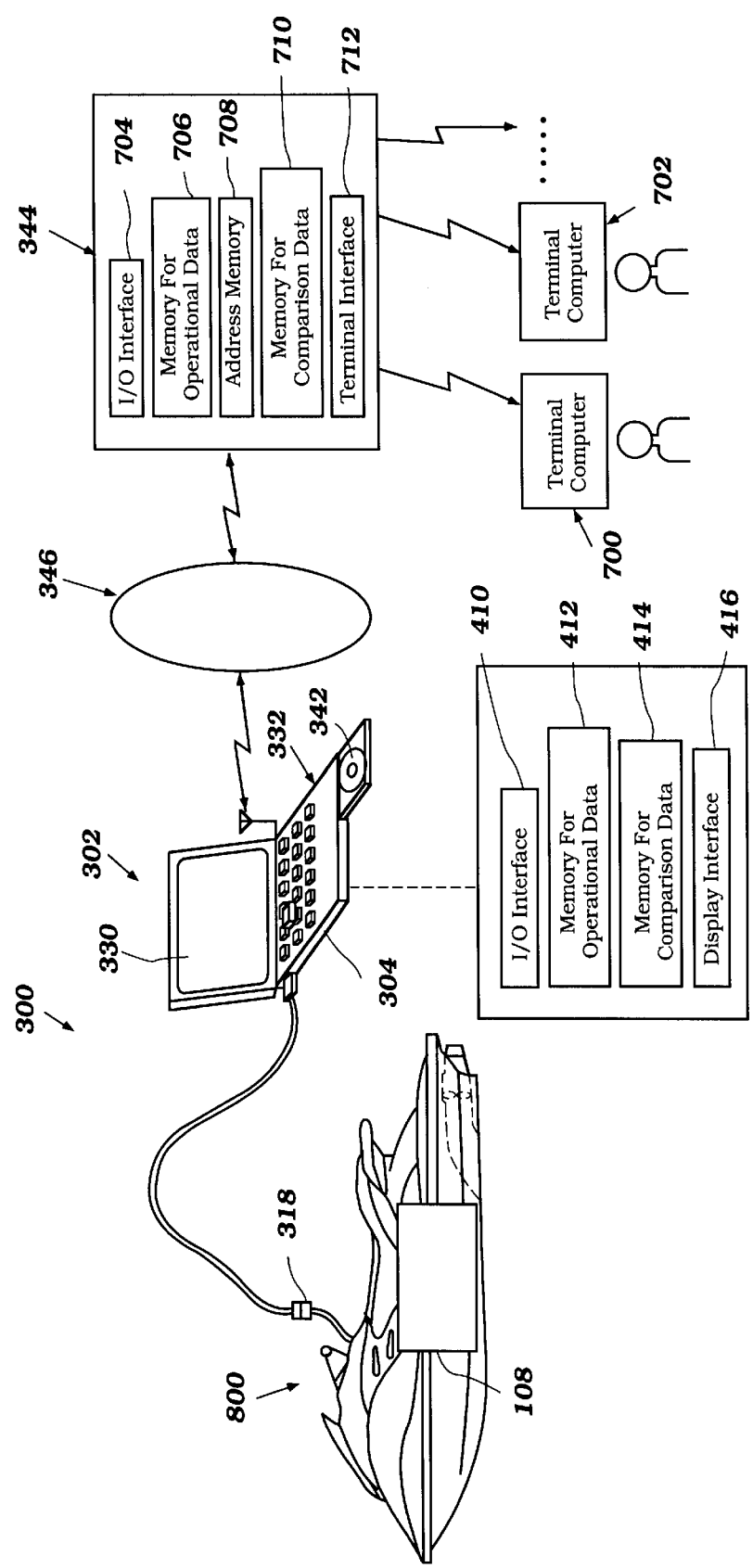
FIG. 23 is a schematic illustration of a modified arrangement of a diagnostic system for the personal watercraft of FIG. 21 having certain features and advantages according to the present invention, the diagnostic system including a computer with a display screen.

FIGS. 21–23 illustrate the engine diagnostic system 300 described above when used with a personal watercraft 700. The illustrated watercraft 800 is powered by a four-cycle engine 58" such as the one described above. As such, a description of the engine 58" can be found above.

As shown in FIGS. 21 and 22, the personal watercraft 800 includes a hull 814 generally formed with a lower hull section 816 and an upper hull section or deck 818. Both the hull sections 816, 818 are made of, for example, a molded fiberglass reinforced resin. The lower hull section 816 and the upper hull section 818 are coupled together to define an internal cavity. A gunnel 822 defines an intersection of both the hull sections 816, 818.

The upper hull section 814 includes a hutch cover 824, a control mast 826 and a seat 828 one after another from fore to aft. In the illustrated arrangement, a bow portion 830 of the upper hull section 818 slopes upwardly and an opening is provided through which the rider can access the internal cavity. The hutch cover 824 preferably is detachably affixed to the bow portion 830 so as to cover the opening.

The control mast 826 extends generally upwardly almost atop the bow portion 830 to support a handle bar 832. The handle bar 832 is primarily provided for controlling the direction of a water jet that propels the watercraft 800. The handle bar 826 carries control units such as, for example, a throttle lever (not shown).

The seat 828 extends along the center of the watercraft 800 at the rear of the bow portion 818. This area in which the seat 828 is positioned is a rider's area. The seat 828 has a saddle shape so that the rider can straddle it. Foot areas (not shown) are defined on both sides of the seat 28 and at the top surface of the upper hull section 818. The foot areas are generally flat. The seat 828 preferably is attached to the upper hull section 818 such that it can be selectively removed. An access opening (not shown), which provides access to the internal cavity, is defined under the seat 828. The seat 828 closes the access opening. In the illustrated arrangement, the upper hull section 18 also defines a storage box 834 that is positioned under the seat 828.

A fuel supply tank 836 is placed in the cavity under the bow portion 830 of the upper hull section 818. The fuel supply tank 836 is coupled with a fuel inlet port (not shown) positioned at a top surface of the upper hull section 818 through a duct (not shown). A closure cap (not shown) closes the fuel inlet port. The supply tank 836 can be accessed through the opening disposed under the hutch cover 824.

The engine 58" is located within an engine compartment defined by the cavity The engine compartment preferably is located under the seat 828. The rider thus can access the engine 58" through the access opening under the seat 828. Air is supplied to the engine compartment through one or more air intake ducts (not shown). Except for these air intake ducts, the engine compartment is substantially sealed to protect the engine 58" and a fuel supply system, comprising the fuel supply tank 836, from water.

A jet pump unit 850 propels the watercraft 800. The jet pump unit 850 includes a tunnel or jet pump housing 852 formed on the underside of the lower hull section 816. The tunnel 852 preferably is isolated from the engine compartment by a bulkhead (not shown). The tunnel 852 has an inlet port 856 that opens towards the body of water at its forward bottom. An impeller 857 is placed at a middle portion of the tunnel 852. An impeller shaft 858 extends forwardly from the impeller and is coupled with a crankshaft 860 of the engine 58" by a coupling member 862. The crankshaft 860 of the engine 58" thus drives the impeller shaft 858. The rear end of the tunnel 852 defines an outlet port (not shown). A steering nozzle 864 is affixed to the outlet port for pivotal movement about a steering axis extending generally vertically. The steering nozzle 864 is connected to the handle bar 832 by a cable (not shown) so that the rider can steer the nozzle 864.

When the impeller 857 rotates, water from the surrounding body of water is drawn through the inlet port 856. The water is discharged through the outlet port as a jet of water. This water jet propels the watercraft 800. The rider can steer the steering nozzle 864 with the handle bar 832.

FIG. 22 illustrates the engine 58". As explained above, the illustrate engine 58" is a four-cycle engine similar to the engine described above with respect to FIG. 58. The ECU 108 preferably is connected to additional sensors, which are particularly useful for diagnosing problems with personal watercraft. In particular, the illustrated watercraft preferably includes a watercraft speed sensor 880, which is operatively connected to the ECU 108. The speed sensor 880 may be of any known type. The cooling system is preferably arranged to draw cooling water from the water passing through the jet pump unit 850. As such, a cooling water passage 882 preferably communicates with the jut pump unit and the engine 58" so as to provide cooling water to the engine 58". The cooling water is preferably discharged through a cooling water discharge line 888. As such, the cooling system for the personal watercraft preferably is an "open" system. However, in other arrangements, the cooling system can also be "closed". In communication with the cooling water passage 882 are a cooling water pressure sensor 884 and a cooling water temperatures sensor 886. These sensors 884, 886 are operatively connected to the ECU 108.

The diagnostic system 300 (see FIG. 23) for the watercraft 800 preferably is configured as above. However, in this arrangement, the ECU 108 preferably collects operational data that includes at least (i) the cooling water pressure from the cooling water pressure sensor 884, the cooling water temperature from the cooling water temperatures sensor 886, and the (iii) the watercraft speed from the watercraft speed sensor 880. As such, the technician can engineer can use the cooling water temperature, the cooling water pressure and the watercraft speed as described above to diagnose the engine 58 of the watercraft 800.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein said diagnostic system further comprises a second computer that is operatively connected to the first computer and the first computer is configured to transmit at least some of the operational data retrieved from the data storage device to the second computer.

2. A diagnostic system as in claim 1, wherein at least some of the engine sensors are disposed apart from the engine.

3. A diagnostic system as in claim 1, wherein said engine is enclosed within a cowling.

4. A diagnostic system as in claim 3, wherein said engine is a two cycle engine.

5. A diagnostic system as in claim 3, wherein said engine is a four-cycle engine.

6. A diagnostic system as in claim 5 wherein said engine comprises an induction system, which comprises a bypass passage with an idle speed control valve, said operational data comprising a position of said idle speed control valve.

7. A diagnostic system as in claim 1, wherein said watercraft is a personal watercraft.

8. A diagnostic system as in claim 7, wherein said operational data comprises a speed of the personal watercraft.

9. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein the computer program is configured display at least some of the operational data in a graphical format.

10. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein the computer program is configured display at least some of the operational data in a tabular format.

11. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein electronic control unit is configured to collect operational data from the one or more engine sensors at intervals.

12. A diagnostic system as in claim 11, wherein said electronic control unit is configured to store said operational data from a time period comprising a set of most recent intervals in said data storage device.

13. A diagnostic system as in claim 12, further comprising a record stop switch that is operatively connected to said electronic control unit, the electronic control unit configured to stop collecting operational storage data when the record stop switch is activated and to store operational data from the time period in a non-volatile memory device.

14. A diagnostic system as in claim 12, wherein the electronic control unit is further configured to sense a failure and to stop collecting operational storage data when said failure is detected to store operational data from the time period in a non-volatile memory device.

15. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein electronic control unit is configured to collect operational data from the one or more engine sensors at substantially one minute intervals.

16. A diagnostic system as in claim 15, wherein said electronic control unit is configured to store data from substantially the past thirteen minutes in said data storage device.

17. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and further comprising a record stop switch that is operatively connected to said electronic control unit, the electronic control unit configured to stop collecting operational storage data when the record stop switch is activated and to store operational data from the time period in a non-volatile memory device.

18. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein said computer program is configured to receive an input indication of engine type and to display different types of data depending on the indicated engine type.

19. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein said electronic control unit is further configured to determine to identify an operational condition from at least some of the operational data.

20. A diagnostic system as in claim 19, wherein said electronic control unit is further configured to determine an accumulated operating time at the operational condition and to store said accumulated operating time in said memory storage device.

21. A diagnostic system for aiding a technician or engineer in diagnosing an engine malfunction in a motor that comprises and engine and is associated with a watercraft, the diagnostic system comprising:

an electronic control unit operatively coupled to a data storage device and to one or more engine sensors, the electronic control unit configured to collect operational data from the one or more engine sensors and to store the collected operational data in said data storage device;

a computer with a computer processor operatively coupled to a memory, an interface device and a display monitor, said computer comprising a computer program stored in the memory and configured to retrieve operational data from the data storage device, the computer program further configured to display the operational data collected from the engine sensors, and wherein said engine is enclosed within a cowling, and wherein said one or more sensors comprises an lubrication pressure sensor and said operational data comprising a signal from said lubrication pressure sensor.

22. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, further comprising sending at least some of the operational data from the computer to a display at a remote location and displaying the data on the remote display screen.

23. A method as in claim 22, wherein collecting operational data involves collecting data from a sensor that is disposed apart from an engine of the motor.

24. A method as in claim 22, further comprising determining if the motor is operating above a predetermined speed, and only collecting operational data if the motor is operating above said predetermined speed.

25. A method as in claim 22, wherein said motor is an outboard motor.

26. A method as in claim 25, wherein said engine is a two cycle engine.

27. A method as in claim 25, wherein said engine is a four-cycle engine.

28. A method as in claim 1, wherein said watercraft is a personal watercraft.

29. A method as in claim 28, wherein said operational data comprises at least in part a speed of the personal watercraft.

30. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, wherein displaying the chosen set of operational data involves displaying the chosen set of data in a graphical format on the display screen.

31. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, wherein displaying the chosen set of operational data involves displaying the chosen set of data in a tabular format on the display screen.

32. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, wherein collecting the operational data involves collecting at least some of the data during regular intervals and storing the data involves storing at least some of the data collected during the regular intervals for a time period that is greater than the regular intervals and discarding data substantially older than the time period.

33. A method as in claim 32, further comprising determining if there is a failure from the one or more sensors and if there is a failure stopping collection of operational data and storing the operational data that has been collected in a non-volatile memory device.

34. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, further determining if a record stop switch has been activated, and if the record stop switch has been activated stopping collection of the operational data storing the operational data that has been collected in a non-volatile memory device.

35. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, wherein collecting the operational data involves collecting at least some of the data at substantially one minute intervals and storing the data involves storing at least some of the data for substantially thirteen minutes and discarding data substantially older than thirteen minutes.

36. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, further comprising indicating engine type and displaying different types of data on the display screen depending upon engine type.

37. A method as in claim 36, further comprising comparing said displayed operational data to a set of comparison data which depends upon the indicated engine type.

38. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, further comprising determining if the motor is operating below a predetermined speed, and if the motor is operating below the predetermined speed, stopping the collection of operational data.

39. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, further comprising using one or more of said operational data to identify an operational condition.

40. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, further comprising determining the accumulated operating time at the operational condition and storing the accumulated operating time in the memory storage device.

41. A method as in claim 40, wherein said operational condition is defined at least in part by an engine speed.

42. A method as in claim 40, wherein said operational condition is defined at least in part by a signal from a throttle valve sensor.

43. A method as in claim 40, wherein said operational condition is defined at least in part by a signal from an air/fuel ratio sensor.

44. A method as in claim 40, wherein said operational condition is defined at least in part by a signal from an exhaust back pressure sensor.

45. A method as in claim 40, wherein said operational condition is defined at least in part by a signal from an intake air pressure sensor.

46. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, wherein motor is an outboard motor and said engine is four-cycle engine, and wherein said one or more sensors comprises an lubrication pressure sensor and said operational data comprising a signal from said lubrication pressure sensor.

47. A method for diagnosing a malfunction in a motor for a watercraft that comprises an engine and an electronic control unit that is operatively connected to a memory storage device, the method comprising:

collecting operational data from one or more engine sensors with an electronic control unit that is operatively connected to the one or more sensors, storing the operational data from the one or more engine sensors in the memory storage device, retrieving the operational data from the memory storage device with a computer that is operatively connected to the electronic control unit, displaying a chosen set of operational data on a display screen, wherein motor is an outboard motor and said engine is four-cycle engine, and wherein said engine comprises an induction system, which comprises a bypass passage with an idle speed control valve, said operational data comprising a position of said idle speed control valve.

48. A method for diagnosing a malfunction in a motor for a watercraft that comprises an engine and an electronic control unit that is operatively connected to a first memory storage device and a second memory storage device, the method comprising:

defining an operational condition by dividing one or more operational data into groups, defining a set of operational groups based upon said groups of operational data, collecting the operational data from one or more engine sensors with an electronic control unit that is operatively connected to the one or more sensors, identifying a current operational group, storing the current operational group in the first memory storage device, determining if a predetermined amount of time has passed, adding the predetermined amount of time to an accumulated operating time for the current operational group so as to calculate a new accumulated operating time, if the predetermined amount of time has passed, storing the new accumulated operating time in the second memory device.

49. The method as in claim 48, further comprising retrieving the new accumulated operating time from the second memory storage device with a computer that is operatively connected to the electronic control unit.

50. The method as in claim 49, further comprising displaying the new accumulated operating time on a display screen.

51. A method as set forth in claim 49, further comprising sending the new accumulated operating time to a second computer at a remote location and displaying the data on the remote display screen.

52. A method as in claim 49, wherein collecting operational data involves collecting data from a sensor that is disposed apart from an engine of the motor.

* * * * *